(12) United States Patent
Kremeyer

(10) Patent No.: US 8,960,596 B2
(45) Date of Patent: Feb. 24, 2015

(54) ENERGY-DEPOSITION SYSTEMS, EQUIPMENT AND METHOD FOR MODIFYING AND CONTROLLING SHOCK WAVES AND SUPERSONIC FLOW

(76) Inventor: Kevin Kremeyer, Tucson, AZ (US)

( * ) Notice: Subject to any disclaimer, the term of this patent is extended or adjusted under 35 U.S.C. 154(b) by 1306 days.

(21) Appl. No.: 12/733,252

(22) PCT Filed: Aug. 20, 2008

(86) PCT No.: PCT/US2008/009885
§ 371 (c)(1),
(2), (4) Date: Feb. 19, 2010

(87) PCT Pub. No.: WO2009/025803
PCT Pub. Date: Feb. 26, 2009

(65) Prior Publication Data
US 2011/0030379 A1    Feb. 10, 2011

Related U.S. Application Data

(60) Provisional application No. 60/935,580, filed on Aug. 20, 2007.

(51) Int. Cl.
*F02K 7/14* (2006.01)
*G01M 9/06* (2006.01)

(52) U.S. Cl.
CPC . *F02K 7/14* (2013.01); *G01M 9/065* (2013.01)
USPC .................... 244/53 B; 137/15.1; 60/768

(58) Field of Classification Search
USPC ............ 89/36.01, 36.02, 36.04, 36.08, 36.09, 89/36.11; 244/1 R, 53 A, 53 B; 60/767, 768; 137/15.1, 15.3
See application file for complete search history.

(56) References Cited

U.S. PATENT DOCUMENTS

| | | | |
|---|---|---|---|
| 3,483,881 A | 12/1969 | Pike et al. | |
| 3,620,484 A | 11/1971 | Schoppe et al. | |
| 3,719,829 A | 3/1973 | Vaill | |
| 3,799,475 A * | 3/1974 | Mitchell et al. | 244/53 B |
| 4,303,845 A | 12/1981 | Davis | |
| 4,937,552 A | 6/1990 | Lam | |
| 4,991,795 A | 2/1991 | Koncsek | |
| 5,109,670 A * | 5/1992 | Harshman | 60/204 |
| 5,806,301 A * | 9/1998 | auBuchon et al. | 60/204 |
| 6,370,219 B1 | 4/2002 | Peale | |
| 6,527,221 B1 * | 3/2003 | Kremeyer | 244/1 N |
| 6,694,808 B2 | 2/2004 | Sawada et al. | |
| 7,063,288 B1 * | 6/2006 | Kremeyer | 244/1 R |
| 7,180,081 B2 | 2/2007 | Walker et al. | |
| 7,648,100 B2 * | 1/2010 | Kremeyer | 244/1 R |

(Continued)

OTHER PUBLICATIONS

International Search Report dated Nov. 7, 2008 for PCT/US2008/009885.

*Primary Examiner* — Benjamin P Lee
(74) *Attorney, Agent, or Firm* — Jones Day

(57) ABSTRACT

Systems, equipment, and methods to deposit energy to modify and control shock waves and hypersonic or supersonic fluid flow, including systems for controlling, mitigating, and/or effecting air flow in relation to air vehicles, wind tunnels, or other assets, or the like, as well as systems, equipment, and methods for disrupting the shock structure at the inlet for the engine of an air vehicle traveling at supersonic or hypersonic speed; mitigating blast effects on vehicles; mitigating heating of throats in supersonic and hypersonic wind tunnels, as well as control the flow parameters and Mach number in their test sections.

24 Claims, 13 Drawing Sheets

(56) References Cited

U.S. PATENT DOCUMENTS

| | | | |
|---|---|---|---|
| 8,079,544 B2 * | 12/2011 | Kremeyer | 244/1 R |
| 8,251,312 B1 * | 8/2012 | Daso et al. | 244/130 |
| 8,359,825 B2 * | 1/2013 | Alvi | 60/204 |
| 8,528,341 B2 * | 9/2013 | Grossi | 60/767 |
| 8,534,595 B2 * | 9/2013 | Kremeyer | 244/1 R |
| 2003/0070913 A1 | 4/2003 | Miller et al. | |
| 2007/0176046 A1 | 8/2007 | Kremeyer | |
| 2008/0303375 A1 * | 12/2008 | Carver | 310/306 |
| 2013/0016449 A1 * | 1/2013 | Crandall | 361/232 |
| 2013/0213481 A1 * | 8/2013 | Drayna et al. | 137/1 |

* cited by examiner

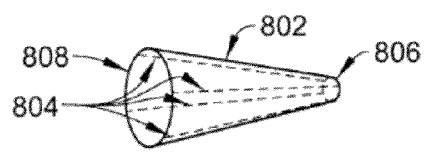
Fig. 8(a)
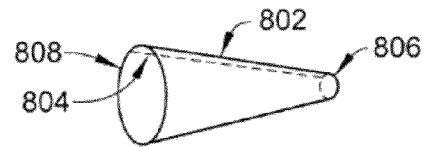
Fig. 8(b)
Fig. 8(a)(1)
Fig. 8(b)(1)
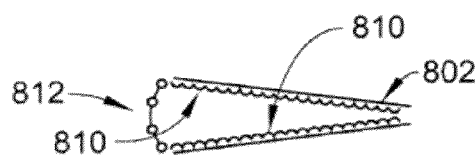
Fig. 8(a)(2)
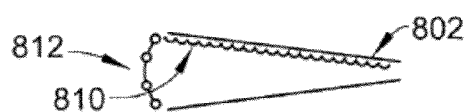
Fig. 8(b)(2)
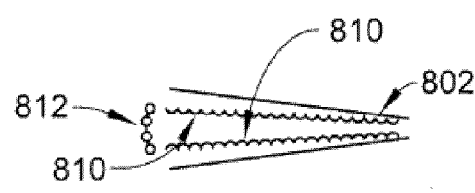
Fig. 8(a)(3)
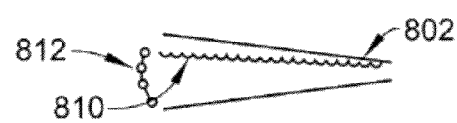
Fig. 8(b)(3)

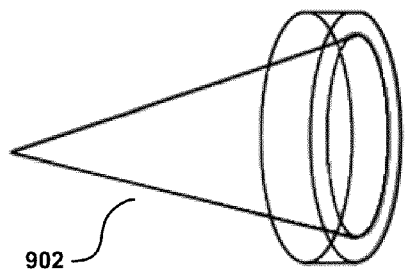
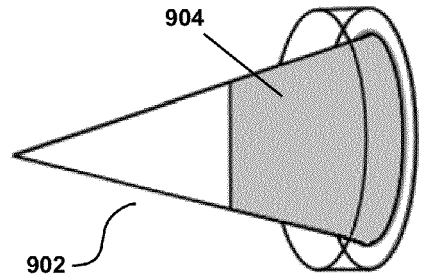
Fig. 9(a)　　　　　　Fig. 9(b)
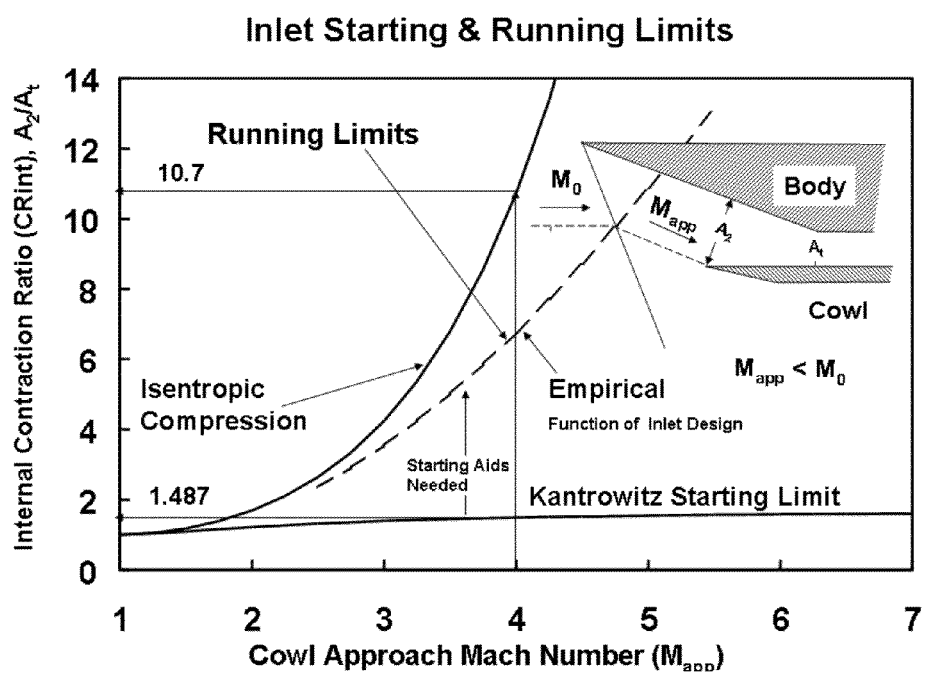
Fig. 10

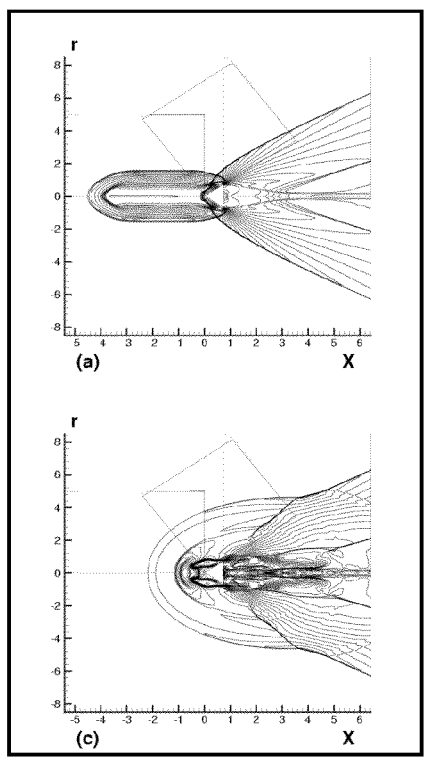 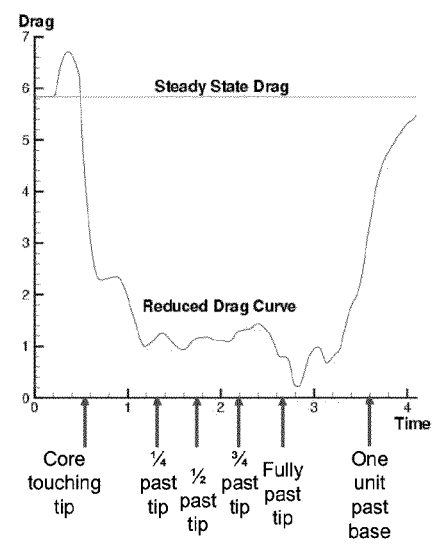
Fig. 11(a)                    Fig. 11(b)

ENERGY-DEPOSITION SYSTEMS, EQUIPMENT AND METHOD FOR MODIFYING AND CONTROLLING SHOCK WAVES AND SUPERSONIC FLOW

CROSS REFERENCE TO RELATED APPLICATION

This application is the National Phase application of International Application No. PCT/US2008/009885, filed Aug. 20, 2008, which designates the United States and was published in English, and which further claims the benefit of priority from U.S. Provisional Application No. 60/935,580, filed on August 20, 2007. The foregoing related applications, in their entirety, are incorporated herein by reference.

INCORPORATION BY REFERENCE

The present application further incorporates herein by reference the contents, in their entirety, of U.S. patent application Ser. No. 11/540,964, filed on Oct. 2, 2006, and U.S. patent application Ser. No. 11/288,425, filed on Nov. 29, 2005, as well as U.S. Pat. No. 7,121,511, U.S. Pat. No. 7,063,288 and U.S. Pat. No. 6,527,221.

FIELD OF THE INVENTION

This invention relates to systems, equipment, and methods to deposit energy to modify and control shock waves and hypersonic or supersonic fluid flow. The invention more specifically relates to controlling, mitigating, and/or effecting fluid (such as, air) flow in relation to air vehicles, wind tunnels, or other assets, or the like. For example, the systems, equipment, and methods can be employed to disrupt the shock structure at the inlet for the engine of an air vehicle traveling at supersonic or hypersonic speed; to mitigate blast effects on vehicles; and to mitigate heating of inner surfaces (such as throat regions) in wind tunnels, such as supersonic and hypersonic wind tunnels, as well as control the flow parameters and Mach number in the test sections of such wind tunnels.

BACKGROUND OF THE INVENTION

A scramjet (supersonic combustion ramjet) is a variation of a ramjet with the distinction being that the combustion process takes place supersonically. A scramjet engine includes a constricted path, through which inlet air is compressed by the high speed of the vehicle; a combustion chamber where fuel is combusted; and an expanding exhaust portion through which the exhaust jet leaves at higher speed than the inlet air.

Although scramjets are an example of an asset having a supersonic fluid inlet, there are many others. When supersonic inlets are brought up to operational speed from lower speeds, a build-up of air can create a standoff shock in front of the inlet, preventing the air from streaming through the inlet, into the engine, without first going through this undesired and non-optimal shockwave. Such a shockwave can prevent, for example, a scramjet engine from properly operating; therefore, it is desired for such shockwaves to be minimized, lessened, or eliminated. Once the air is flowing properly through the necked down region of the inlet, the supersonic flow through the inlet can take place as designed, and the inlet is said to be "started".

There are several ways that have been considered to date to address the presence of an undesired shockwave at an inlet. One approach at a scramjet inlet, for example, is to "swallow the shock". This can be done by increasing the speed of the air vehicle to force the stand-off shock, and the air backed up behind it, to squeeze through the smallest point (i.e., throat or neck) of the inlet. This requires that the engine(s) be oversized by 20-25%, which is a large concern when designing supersonic or hypersonic air vehicles. In particular, for example, there are many design trades that need to be made, and having a powerplant that is 25% too heavy prevents designers from meeting all of the constraints on mass, lift, power, drag, etc.

One proposed way to address the undesired shockwave at the opening of an unstarted supersonic or hypersonic inlet, in particular for scramjet engine inlets, is to cover the inlet holding a roughly evacuated space behind that covering (not just covering the neck/throat of the inlet, but covering the whole open region) until the vehicle gets up to the operational design speed, and then removing/rupturing the covering membrane, at which point the inlet starts because there is no built up air blocking the flow. This approach is, at best, feasible as a one-time solution; however, if the inlet failed to start the first time, or if the vehicle had to slow for some reason during flight or un-start the inlet in any other way during flight and then come up to speed and re-start the engine, it would be impractical to cover the inlet again while in flight to evacuate the region behind it.

Another approach, considered to address the problem related to scramjet engine inlet starts/restarts, is to employ fixed geometry systems that typically rely on passive means to start the inlet system, using bleed holes or slots to reduce the mass capture to an amount required to allow sonic flow at the throat. The problem is that these system lead to large inefficiency in that once the inlet is started, these same holes result in increased inlet drag and typically allow a small amount of capture mass to escape without being ingested into the engine. FIG. 1, for example, illustrates a conventional streamtraced Busemann inlet having an inlet neck that narrows to a small opening, through which all air entering the inlet has to be funneled, prior to entering the combustion portion of the engine. The geometry of the Busemann inlet is modified, in some circumstances, by slitting the inlet open to allow some of the captured air to spill out of the inlet if it can not stream through the flow path unimpeded. This narrowing structure of the Busemann inlet is further illustrated via the spatial grid that is provided in FIG. 1, which depicts the relative circumferences of the inlet edge of the Busemann inlet and the throat region of the Busemann inlet.

Another approach to swallowing the shock is to mechanically open the throat, allow the shock to pass through, and then neck the throat down to the designed operating geometry. The required mechanical actuators, however, are relatively slow and add weight and risk of failure to the engine system.

Supersonic and hypersonic flows also have undesirable effects on the inner surfaces of wind tunnels, such as the throat region of supersonic or hypersonic wind tunnels. Wind tunnels, in this regard, are research tools developed to assist with studying the effects of air moving over or around solid objects. Current hypersonic wind tunnels fall into two basic categories: long duration (blow-down and continuous) facilities and short duration (impulse) facilities. For both categories, throat erosion within the wind tunnel, due to excessive heat transfer from hypersonic and supersonic flow, is a major performance and maintenance concern. In addition, certain facilities are often limited to fixed or single Mach number capabilities.

Other sources of shock waves, blast waves, and associated supersonic or hypersonic flow are improvised explosive devices (IEDs), bombs, landmines, or the like, which are often placed within the driving surface or on the side of roads, so as to detonate in the presence of passing vehicles. When such devices discharge near (such as under) a vehicle, the shockwave associated with such IED detonation can impart substantial damage to the vehicle/cargo and, most disturbingly, to the occupants of the vehicle.

Accordingly, there is a need within many contexts for a way to control, mitigate, and/or effect shock waves, blast waves, supersonic flows, and/or hypersonic flows, in relation to assets, such as air vehicles, ground vehicles, wind tunnels, and the like.

BRIEF SUMMARY OF THE INVENTION

In some embodiments, systems, equipment, and methods are provided for depositing energy to modify and control shock waves, blast waves, hypersonic fluid flow, and/or supersonic fluid flow. The invention more specifically relates to controlling, mitigating, and/or affecting fluid (such as air) flow, typically hypersonic or supersonic fluid flow, in relation to an asset.

In some embodiments, the systems, equipment, and methods may be employed to control, mitigate, and/or affect the shockwave, blast wave, hypersonic fluid flow, or supersonic fluid flow, associated with or imparted on a variety of objects when in use.

In some embodiments, the systems, equipment, and methods may be employed to disrupt a shock wave at an inlet for the engine of an air vehicle traveling at supersonic or hypersonic speed.

In some embodiments, the systems, equipment, and methods may be employed to lessen or mitigate the effect of shockwaves or blast waves, resulting from bombs or other explosive devices, on, for example, ground vehicles.

In some embodiments, the systems, equipment, and methods may be employed to mitigate the heat effect (such as ablative heat effect) of supersonic or hypersonic fluid (such as air) flow on an inner surface (such as an interior surface of the throat region) of a supersonic and/or hypersonic wind tunnel.

In some embodiments, the systems, equipment, and methods may be employed to control and/or adjust the flow parameters and Mach number in the test sections of supersonic and hypersonic wind tunnels.

In some embodiments, the systems, equipment, and methods may be employed to assist in controlling or modifying the air flow in the inlet of an air-breathing supersonic/hypersonic vehicle.

In some embodiments, the systems, equipment, and methods may comprise and/or utilize a system capable of depositing energy in order to start and/or re-start the inlet when the incoming air travels at supersonic or hypersonic speed with respect to the vehicle, wherein the system comprises: at least one conductive path along a surface of the inlet; at least one energy source that is operably connected to the at least one conductive path; at least one sensor for assessing whether the inlet is in an un-start condition; and at least one controller that is operably connected to the at least one energy source and the at least one sensor, for controlling energy discharge from at least one energy source along at least one conductive path in response to assessment of an un-start condition by at least one sensor.

In some embodiments, the systems, equipment, and methods can be employed to start a supersonic/hypersonic inlet, and comprise: at least one conductive path along a surface of the inlet; at least one energy source that is operably connected to the at least one conductive path; at least one sensor for assessing whether the inlet is in an un-start condition; and at least one controller that is operably connected to the at least one energy source and the at least one sensor, for controlling energy discharge from at least one energy source along at least one conductive path in response to assessment of an un-start condition by at least one pressure sensor.

In some embodiments, systems, equipment, and methods are provided for starting and/or re-starting an inlet (and/or for mitigating a shockwave) by depositing energy, controlled by at least one controller, deriving from at least one energy source, deposited along at least one conductive path, after detection by at least one sensor of an un-start condition.

In some embodiments, systems, equipment, and methods are provided for manufacturing an inlet that can be started at supersonic or hypersonic speed, and/or to accommodate supersonic/hypersonic flow conditions with respect to the inlet, comprising incorporating the system into the inlet.

In some embodiments, the systems, equipment and/or methods comprise two or more conductive paths, and the controller controls the timing of electric discharges along the conductive paths in a phased manner.

In some embodiments, the systems, equipment, and methods comprise two or more conductive paths that are oriented as successive rings around the surface of an inlet, and the controller controls the timing of electric discharges (such as circular electric arcs) along the conductive paths in a phased manner starting with the forward-most conductive ring and progressing in an aft direction, or vice versa.

In some embodiments, the systems, equipment, and methods comprise a first conductive path and a second conductive path, and the controller controls the timing of electric discharges along the first and second conductive paths in a phased manner, such that energy discharge along the first conductive path occurs before energy discharge along the second conductive path occurs, e.g., wherein the energy discharge along the first conductive path occurs shortly before energy discharge along the second conductive path occurs.

In some embodiments, the systems, equipment, and methods comprise a series of two or more conductive paths that are arranged in series from one portion on an inlet surface to a second portion on the inlet surface, and the controller controls the timing of electric discharges along the conductive paths in a phased manner starting at the first conductive portion of the inlet surface and progressing toward the second.

In some embodiments, in response to the assessment by at least one sensor of an un-start condition, a shockwave (or potential or imminent shockwave), a blast wave (or potential or imminent blast wave), or an undesirable test section or throat condition (such as undesirable, such as elevated, throat temperature) in a wind tunnel, the controller causes at least one energy source to discharge energy along at least one conductive path.

In some embodiments, in response to an assessment by at least one sensor, the controller initiates energy discharges of increasing strength along at least one conductive path until the situation has been successfully addressed. Furthermore, any suitable interval between successive discharges may occur in this regard, for example a duration from between 0.0001 ms and 1000 ms.

In some embodiments, the systems, equipment, and/or methods may include igniting a path or surface of propellant (or explosive) as the energy deposition source. The resulting energy deposition can blow air out of the way and allow an inlet to start.

In some embodiments, inner surface(s) of the inlet are changeable between two or more different configurations, such as a first configuration that is substantially (or completely) smooth and which contains no conductive paths (such as for use during normal flight conditions); and a second configuration that comprises one or more conductive paths (such as one or more lines of high explosives machine into it) (such as for use when a shockwave, or the like, is detected as being imminent or actually present). In this regard, for example, inner surface(s) of the inlet can comprise a substantially smooth (such as completely or perfectly smooth) inner surface, and if it is necessary to start the inlet, the surface is modified or switched, using a revolving cylinder, to a smooth surface with a line of high-explosives machined into it. This line can then be detonated to push the air out of the way of the inlet (effectively evacuating the entire inlet area), and as the dynamics are underway, the cylinder can again be switched to the smooth inlet surface not containing a line of explosives. Other embodiments may incorporate or employ systems or methods that do not involve revolving cylinder(s).

In some embodiments, systems, equipment, and methods are provided for depositing energy along one or more conductive paths to mitigate or prevent a shockwave and/or a blast wave, wherein the systems, equipment, and method have the capacity for sensing the potential existence or approach of a shockwave or blastwave to be mitigated or prevented; and discharging sufficient energy along the one or more conductive paths to cause mitigation of, or prevention of, the shockwave and/or blast wave. In another aspect, such as sensing step is performed proximate to one or more surfaces of an inlet for an engine of an air vehicle traveling at supersonic or hypersonic speed, a ground vehicle, or a wind tunnels.

In some embodiments, an air vehicle, for example a scramjet, is provided having at least one jet engine equipped with at least one conductive path, proximate the at least one engine air inlet, and an energy source capable of depositing energy along the conductive path to assist in starting the at least one engine by mitigating, dissipating or minimizing the effect of a shockwave, turbulence and/or pressure build up proximate the at least one engine air inlet.

In some embodiments, a ground vehicle, for example a personnel carrier, is provided which is equipped with at least one conductive path, proximate the undercarriage of the ground vehicle and an energy source capable of depositing energy along the conductive path to assist in mitigating, dissipating or minimizing the effect of a shockwave, blast wave, and/or pressure build up resulting from an explosion, for example an explosion resulting from an IED triggered by the ground vehicle.

Another embodiment of the invention may include a wind tunnel, for example a supersonic wind tunnel, having at least one throat area equipped with at least one conductive path, proximate the at least one throat area, and an energy source capable of depositing energy along the conductive path to assist in mitigating, dissipating or minimizing the effect of heat and/or abrasion from the in-flowing air on the interior surface of the wind tunnel throat area.

Another embodiment of the invention may include a wind tunnel, for example a supersonic wind tunnel, having at least one throat area equipped with at least one conductive path, proximate the at least one throat area, and an energy source capable of depositing energy along the conductive path to assist in adjusting, altering, or changing the effective interior size of the throat to enable the wind tunnel to achieve different and/or various mach numbers.

In some embodiments, the systems, equipment, and/or methods may include a system or element to achieve multiple starts during operation by switching between a smooth surface for normal operations and a smooth surface with fresh explosives embedded/milled into it.

Several embodiments of the invention, including the above aspects of the invention, are described in further detail as follows. Generally, each of these embodiments can be used in various and specific combinations, and with other aspects and embodiments unless otherwise stated herein.

BRIEF DESCRIPTION OF THE DRAWINGS

FIGS. 8(a)-(b) are schematics that depict the effects of energy deposition on two embodiments of funnel-shaped inlets.

FIGS. 9(a)-(b) are schematics that depict embodiments of scramjet engines prior to, and during, energy discharge.

FIGS. 10 is a graph that illustrates the association between the Kantrowitz limit and fixed geometry inlet contraction and inlet starting requirements.

FIGS. 11(a)-(b) are graphs that illustrate simulation results associated with core formation around an inlet cone.

DETAILED DESCRIPTION OF THE INVENTION

Figure 1:
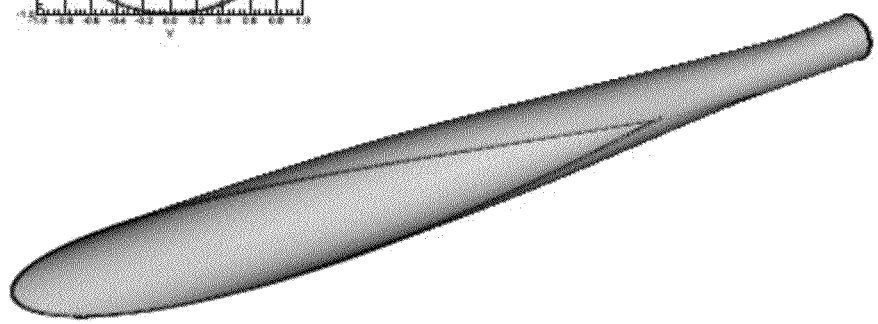
FIG. 1 is a schematic that depicts a conventional streamtraced Busemann inlet.

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing from this or any related application.

To facilitate the understanding of the subject matter disclosed herein, a number of terms, abbreviations or other shorthand as used herein are defined below. These definitions are intended to complement the usage common to those skilled in the art. Any term, abbreviation or shorthand not defined is understood to have the ordinary meaning used by a skilled artisan contemporaneous with the submission of this application.

The term "air vehicle" is used herein to mean any manned or unmanned air vehicle or platform, such as any airplane, launch or re-entry vehicle, space-plane, missile, or the like.

The term "un-start condition" is used herein to mean a threshold flow condition under which air flows through the inlet much less effectively than under its design conditions, and much of the air is rejected from the inlet, instead of being properly ingested for effective operation of the engine.

The term "asset" is used herein to mean any valued object. In particular, a valued object that may be affected by, associated with, or otherwise in an environment having, supersonic fluid flow, hypersonic fluid flow, shockwaves, and/or blast waves. Examples of such assets include, but are not limited to, wheeled or tracked ground vehicles exposed to explosives; supersonic and/or hypersonic air vehicles, and/or supersonic or hypersonic wind tunnels.

The term "inlet" is used herein to define an opening designed for receiving fluid flow, specifically air flow. For example, on a supersonic or hypersonic air vehicle, the engine has an inlet shaped to ingest air and compress it as it necks down to its minimal area called the throat. The air is ingested in order to be combusted with fuel in the air-breathing engine to provide propulsion. Inlets can have a large variety of shapes, ranging from shovel-like scoops on the bottom, sides, front, or top of an air-vehicle. In some cases, when the engines are external to the air-vehicle fuselage, the inlet can comprise an inlet spike, at times resembling a cone protruding from a shroud or cowl. Such annular inlets can also be sectioned off into individual orifices (instead of a nearly continuous open ring), resembling a succession of openings, or individual "scoops", sectioned off within the annular intake region, each necking down to its own respective throat. The inlet surface, as well as the inner surface of the inlet, refer to the portion of the surface of the inlet that compresses the air and/or guides it into the throat, and includes the throat itself. The term "nozzle surface" is similar to an inlet surface, with this term used more commonly for wind tunnel flow trains.

The term "transient discharge" is used herein to define deposition of energy that occurs during a limited temporal duration with respect to the steady-state dynamics of a system.

The term "continuous discharge" is used herein to define deposition of energy that is effectively continuous with respect to the fluid flow dynamics of a system.

The term "conductive path" is used herein to define an area that facilitates the propagation of a discharge of energy (such as an electric discharge) more readily than areas adjacent thereto. For example, a first material that is embedded on top of, or within, a second material may be more conductive than the second material and thereby defines a conductive path defined by the first material. This path can be a straight or curved line, as well as a straight or curved surface. In some embodiments, the actual conductive path should not be so conductive that it minimizes ionization of its neighboring air/gas, thereby precluding conduction of electric current through and energy deposition into said neighboring gas/air. In these embodiments, the conductive paths may facilitate the propagation of the energy discharge, using ionized air as an element (e.g., a fundamental element) of the conduction/discharge process. This will allow the discharge to heat the air, dissipating the bulk of the discharge energy in the ionized air. Different partially-conductive compounds or matrices can be used. In some embodiments, the conductive path will be able to withstand the flow environment, as well as repeated discharge. An example of a conductive path is a high-temperature glass having, embedded therein, one or more conductive elements that define a path. A typical way of using one or more conductive paths is to place a series of metal pieces, preferably metals that are able to withstand high temperatures, along a line or pattern to allow a high energy discharge to jump across the stretches of air connecting the metal pieces. This will allow the energy of the discharge to be dissipated along the stretches of higher-resistance ionized air, that complete the circuit. Another typical conductive path is a coiled conductive element, such as a wire, for delivering RF energy, like an antennae, positioned around or within a non-conductive portion of an asset employing the energy deposition system.

Air Vehicle Engine

An air vehicle engine is provided which comprises an inlet to ingest air and a system for starting the inlet when the air vehicle is traveling at supersonic or hypersonic speed, wherein the system comprises at least one conductive path along a surface of the inlet; at least one energy source that is operably connected to the at least one conductive path; at least one sensor for assessing whether the engine is in an un-start condition; and at least one controller that is operably connected to the at least one energy source and the at least one sensor, for controlling energy discharge from at least one energy source along at least one conductive path in response to assessment of an un-start condition by at least one pressure sensor.

The engine can be any suitable air vehicle engine capable of achieving supersonic or hypersonic speed, such as any air-breathing supersonic or hypersonic engine. In this regard, for example, the engine can be any engine with a converging inlet to concentrate and ingest air, including but not limited to a scramjet, a hybrid ramjet-scramjet engine, a hybrid turbine-scramjet engine, and a pulse detonation engine.

Figure 2:
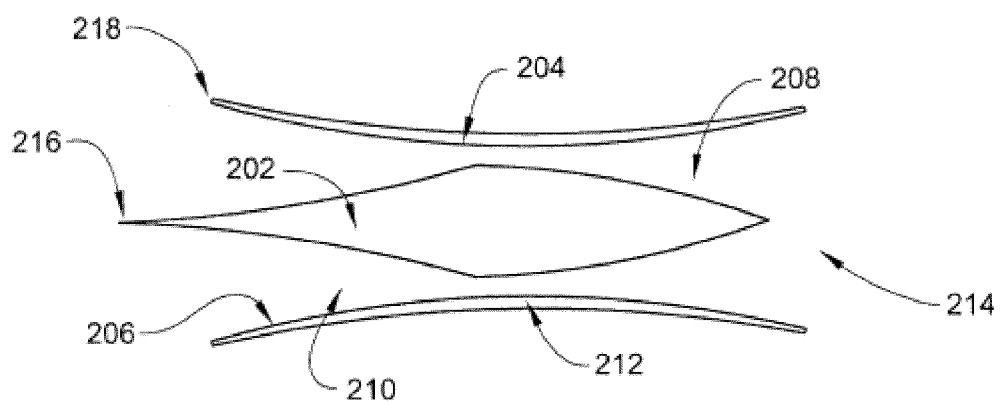
FIG. 2 is a schematic that depicts one embodiment of a conventional scramjet engine.

As is illustrated in FIG. 2, a conventional scramjet engine comprises an inlet body (202) (or inlet cone, shock cone, or spike) having a tip region (216), an inlet edge (218), an inner surface (206), a throat region (204), and a tail region of the inlet body (208). In operation, supersonic compression occurs proximate to region (210), with the majority of combustion occurring proximate to region (212), and supersonic exhaust exiting the scramjet engine at region (214).

The system for starting the inlet (hereinafter "the starter system") allows for control (e.g., automatic, systemized, or manual control) by an operator of the engine (such as an on-board or remote pilot, or a computer that manages the operation of the engine) to start the engine when the engine is already traveling at a supersonic or hypersonic speed, such as when an un-start condition is identified, when a un-start condition is imminent, and/or when the optimal, design-condition flow ceases, due to, for example, insufficient air flow through the inlet of the engine, e.g., due to the formation and/or presence of a non-optimal or standoff shock proximate to the inlet. In some embodiments, by controlling the energy-deposition into the fore inlet, the system allows for the conversion of a normal shock into oblique shock(s) with reduced total pressure losses. The shape of the initial energy bubble, in this regard, can be considered to reduce the internal contraction. In this manner, the controlled collapse of the bubble acts like a variable geometry inlet, allowing the shock to be swallowed, thereby starting the inlet.

In some embodiments, the starter system comprises at least one conductive path along a surface of the inlet; at least one energy source that is operably connected to the at least one conductive path; at least one sensor for assessing whether the inlet is in an un-start condition; and at least one controller that is operably connected to the at least one energy source and the at least one sensor, for controlling energy discharge from at least one energy source along at least one conductive path in response to assessment of an un-start condition by at least one pressure sensor. In this regard, the depositing energy along an inlet surface, or along lines or points on, or along, the inlet surface can take place anywhere along the surface, including the inner guiding surfaces of the scoops, shovels, orifices, spikes, cowls, the throat itself, and/or any leading or trailing edges or points of these surfaces.

Ground Vehicle Application

The system can also be incorporated into a ground vehicle, such as to modify, mitigate, lessen, and/or eliminate blast shocks, or the like, that occur proximate to the vehicle (such as from an IED below the ground vehicle). A ground vehicle asset employing the system would thusly be enabled to sense the presence or imminence of a blast shock, or the like, and initiate an energy deposition scheme. In this manner, the blast shock would in essence be redirected away from the ground vehicle, thereby mitigating, lessening, or preventing impact damage to the asset.

In some embodiments, a energy deposition system is provided for incorporation into or onto a ground vehicle, wherein the system comprises at least one conductive path (such as formed from conductive elements that are embedded in a nonconductive matrix, or formed by ionizing air, e.g., through use of a laser); at least one energy source that is operably connected to the at least one conductive path; at least one sensor for sensing the potential existence or approach of a shockwave or blastwave to be mitigated; and at least one controller that is operably connected to the at least one energy source and the at least one sensor, for controlling energy discharge from at least one energy source along at least one conductive path.

The conductive path(s) can be situated on any suitable surface of the ground vehicle, and in any suitable manner, configuration, and shape discussed in the application. In some embodiments, the system comprises one or more conductive paths that are situated on or in a surface of the ground vehicle, such as along at least a portion of the surface of the bottom (e.g., undercarriage) of the ground vehicle. Alternatively, or in addition, the conductive path(s) can extend, in some embodiments, out from the sides of the vehicle, such as in a horizontal manner, relative to the ground, or in a angular or curved manner. In this manner, an energy discharge can be created which exceeds the width of the bottom surface of the ground vehicle.

In some embodiments, the system comprises suitable energy emitters for forming a ionized air filaments proximate to the ground vehicle asset, and for discharging energy along the filaments. Such filament-guided discharges can be oriented in any suitable manner, such as in a horizontal direction, relative to the ground. Moreover, such filament-guided discharges can originate from any suitable surface of the ground vehicle, such as from a surface of the bottom (or undercarriage) of the vehicle. In some embodiments, such filament-guided discharges emanating from the side of a vehicle's undercarriage, to channel the high pressure gas, can aid in discharging a blast preferentially outward from an explosion under said vehicle, or can channel the blast wave and/or shockwave along the bottom and/or side of said vehicle (such as, to reduce/puncture the confinement underneath the vehicle), and to lessen, mitigate, relieve, and/or eliminate the pressure and force that otherwise would be exerted on the ground vehicle (such as on the undercarriage of the ground vehicle). Conductive paths can also be implemented along the outer perimeter of the vehicle to deposit energy and form low-density channels to direct the shockwave(s) and associated high-pressure products along the bottom and/or side of said vehicle (again, to reduce or puncture the confinement underneath the vehicle). In this regard, the energy deposition system can generate low-density channels (such as outside and to the side of the ground vehicle, or along the vehicle surface) that provide a preferential path along which the high pressure gas (such as a blast wave or shockwave, or the like) can flow. In some embodiments, therefore, the energy deposition system is useful for facilitating flow (flow blast waves, shockwaves, or the like) along conductive paths (created by the system), and for mitigating the confinement otherwise experienced by the expanding gases, and providing an alternative path for flow to travel (without damaging the ground vehicle). The reduction in pressure and force on the vehicle's undercarriage reduces the ability of the blast to penetrate the vehicle, thereby reducing damage to the vehicle/cargo and injury to the occupants. The electric discharge can be initiated by an optical sensor, capable of detecting the optical signature from a threat explosion/blast.

In some embodiments, the system works to mitigate damage to such an asset in the presence of a blast wave by creating low-resistance paths, along which the blast wave can propagate, thereby minimizing the confinement of the high-pressure gas driving the blast wave that would otherwise press into (e.g., collide with, exert force upon, or impact) the asset and cause greater damage.

Incorporation Into Wind Tunnel

The system can also be incorporated into a wind tunnel, such as a supersonic and/or hypersonic wind tunnel, such as to mitigate heating of an inner surface (such as surfaces of the throat) of the wind tunnel, as well as control the flow parameters and Mach number in the test sections of the wind tunnel, e.g., by directing at least a portion of such high speed air flow away from such inner surface(s).

Energy deposition, in this regard, can lessen the ablative heat transfer experienced at the throat of a wind tunnel. This is due, at least in part, to the fact that, while the heat transfer depends linearly on the temperature difference between the flow and the surface, such heat transfer depends more strongly on the gas density (as the cube of the density). Energy deposition into the flow along the surface, therefore, results in a strong decrease in heat transfer at the throat (although the gas temperature is higher).

With energy deposition, convective heat transfer to hypersonic nozzle throats will be reduced. This technique also provides an opportunity to actively control the wind tunnel flow conditions and test Mach number, potentially while the tunnel is running.

Throat heat transfer can be reduced through energy deposition along the surface of the contracting nozzle. In particular, energy can be introduced in the throat region, in order to contour the streamlines away from the throat surface, thereby introducing a virtual throat. This approach also represents a potential new means to actively control the nozzle area ratio and hence the tunnel Mach number. In this manner, it is possible by depositing energy proximate to the throat region to create hypersonic wind tunnel nozzles that (1) have lower throat heat transfer and (2) that allow for active control of the flow Mach number and test section flow conditions. This will allow long duration testing at higher Mach numbers than currently achievable. Control of the virtual throat will also allow arbitrary tunability over Mach number without stopping the tunnel, instead of limiting a given test to a fixed Mach number among a discrete set of choices.

FIG. 15($a$) illustrates a sample embodiment of a supersonic or hypersonic wind tunnel, wherein the wind tunnel (1000) comprises a throat region (1002) and a conductive path, or flow antennae, comprising an RF energy source (1006). FIG. 15($b$) illustrates a cross-section of another sample embodiment of a supersonic or hypersonic wind tunnel, wherein the wind tunnel (1000) comprises a throat region (1002), a conductive path for energy deposition (1008), and a test body (1004).

In the extreme cases of violent energy deposition through an "instantaneous" electric discharge, nearly all of the gas can be expanded away from the wall, resulting in very little gas to conduct heat to the throat upon contraction. This kind of instantaneous/violent deposition is certain to cause perturbations that propagate through to the test section, representing an unacceptable approach to protecting the throat. In contrast, continuous levels of electric arc or RF energy can be injected into the surface flow, ranging from zero effect to strong heating.

Very light levels of RF energy deposited along the surface will result in no noticeable effect in the test section, and as the amount of energy is increased, continuous control likely can be achieved, not only to protect the throat from unacceptably high heat flux, but also to exercise a level of control over the contraction ratio/profile to yield a variable Mach number nozzle, from an otherwise static geometry. Exceeding the capabilities of RF deposition, a standing arc along the nozzle surface can be employed to achieve higher levels of energy deposition.

Figure 14:
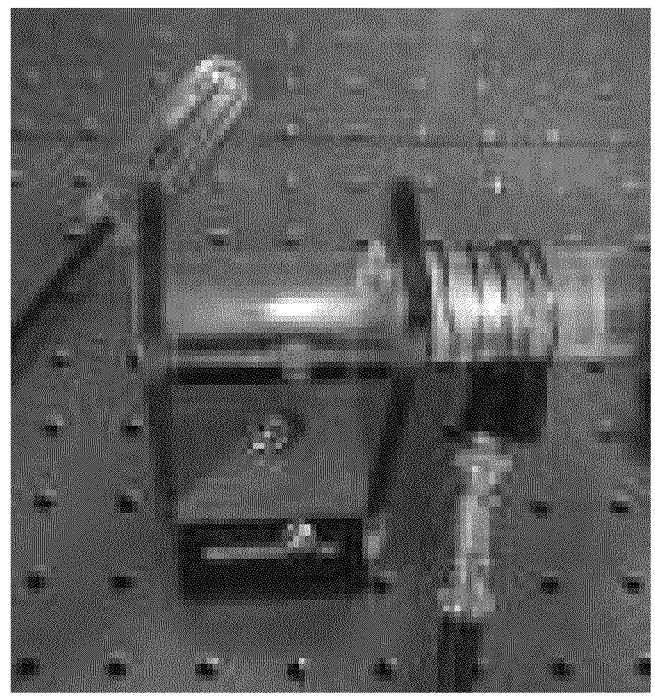
FIG. 14 is a picture illustrating the effect of heating gas within a dielectric chamber.

FIG. 14 illustrates the effect of heating gas inside of a dielectric chamber, using conductive paths outside of the dielectric chamber as antennae to deposit RF energy. This is performed to achieve a plasma sheath covering the inside wall/surface.

Conductive Path(s)

Conductive path(s) for the energy deposition system are used for certain cases of depositing electromagnetic energy into the gas or air along a path or region proximate to a surface. The conductive paths can be of a suitable size, shape, and material to, under the correct electrical loading, cause air proximate to the conductive path(s) to at least partially ionize to facilitate coupling of electric or electromagnetic energy into the gas or air, thereby heating the gas such that it expands away from the conductive path(s), leaving behind a region occupied by low density gas or air.

In the case where the energy deposition is in the form of alternating current, such as radio frequency (RF) or microwave energy, the surface material must be dielectric to allow penetration/transmission of the microwave or RF energy to the air, whereas the conductive surface serves as the antenna to transmit/couple/focus the energy into the air.

In the case where the energy deposition is in the form of an electric discharge, the surface must be of a generally low-conductivity (electrically insulating) material and the conductive path(s), in this regard, can comprise any suitable material or combination of materials with an increased electrical conductivity over the less electrically conductive surface material. In such cases the electrically more conductive (or "preferentially conductive") path must not conduct electricity sufficiently well that the current will not arc through and heat the gas near the surface. In fact when depositing electrical discharge energy, it is desired that as much of the electric discharge energy as possible is deposited into the air. This takes place when the air ionizes to carry the electric discharge. In some embodiments, the conductive path(s) comprise both conductive and nonconductive (e.g., minimally conductive) elements, such that, for example, a discontinuous path of conductive elements, with intervening nonconductive elements, is formed, such as any one or more at least partially conductive metals (e.g., metallic staples or studs that are embedded flush to an insulating surface and/or metallic flakes, strands, or powder) and/or non-metals (e.g., ceramic; forms of carbon including but not limited to nanotubes, $C_{60}$, $C_{70}$, or graphite; preferentially conductive nonmetallic materials, including but not limited to ceramics; or composite material), or combination or mixture thereof In such embodiments, the energy discharge along the conductive path can occur, e.g., by jumping or hopping between successive conductive elements such as by ionizing the intervening nonconductive elements, in particular by ionizing the air proximate to the surface. Such conductive paths that comprise both conductive and nonconductive elements can exist in any suitable form, such as in the form of a matrix of nonconductive material that includes interspersed conductive elements, or as a discontinuous path of conductive elements with intervening nonconductive elements. In some embodiments, the conductive elements have little or no reactivity with the insulating matrix or with the air or gas that is proximate to the conductive elements. In some embodiments, the conductive path(s) are situated on a nonconductive or minimally conductive surface. For examples, for applications involving higher Mach numbers, the conductive path can comprise high-temperature metal embedded in the non-conductive surface, in order to endure the associated harsh conditions. The nonconductive elements can comprise any suitable material, such as air or gas, or any suitable insulating, dielectric, composite, covalently bonded (such as a ceramic, glass, or crystal materials or coatings), and/or polymer material (such as high temperature polymer material). For cases in which air is the primary insulating material, the conductive path can be made by ionizing a path through the air using a laser, among other possibilities. In some embodiments, the surface of the inlet is modified to support transient energy deposition along that surface (electric discharge, explosive, combusting fuel, or combination thereof, such as a combination of combusting fuel and electric discharge).

In some embodiments, the conductive path(s) do not wear out and can withstand repeated discharge of energy along the conductive path(s) with little or no reduction or alteration in their electrical properties. For energy deposition in the form of electric discharge, the conductive path(s) can be situated on (e.g., situated in, embedded in, and/or forming a portion of) any suitable one or more surfaces and/or along one or more paths in the air.

In some embodiments to start an inlet, the conductive path(s) can extend at least partially across and/or transverse any suitable surface(s) of the inlet from which ionized and/or expanding air (e.g., low density air) from the conductive path(s) cause disruption, mitigation, elimination, lessening, and/or modification of a non-optimal shockwave or standoff shock that has formed (or exists) proximate to the inlet, such that, for example, an increase of air flow through the inlet (e.g., to a level sufficient for the inlet to run) is achieved, thereby enabling the inlet to start. In some embodiments, the conductive path(s) are situated or oriented on suitable surface(s) to cause air to ionize and expand, move, travel, sweep, and/or push in a direction away from the conductive path(s).

Figure 7A:
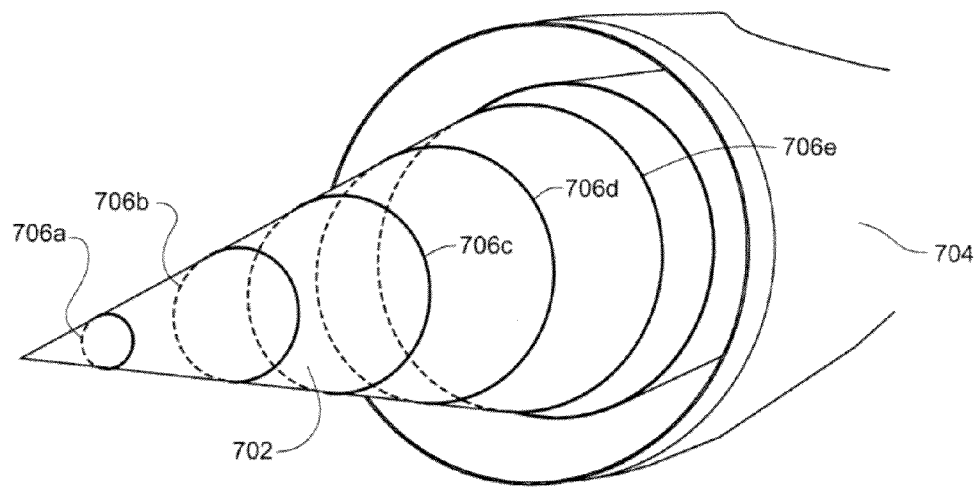
FIGS. 7(a)-(b) are schematics of supersonic engines with conductive paths.
Figure 7B:
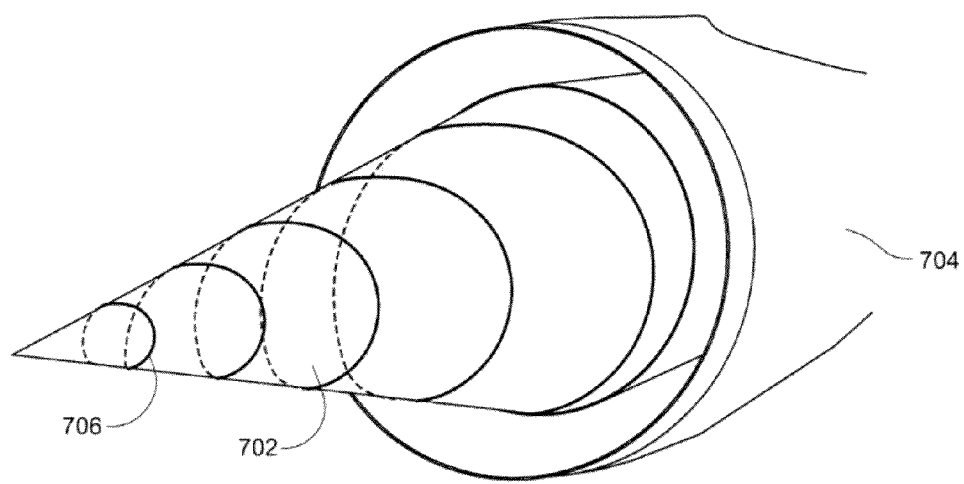

In some embodiments to start an inlet, one or more conductive paths are situated on the inlet throat, the inlet edge (or inlet cowl), and/or the inlet surface. In some embodiments, one or more conductive paths are situated on a surface or in the air, forward of the inlet edge. In some embodiments, one or more conductive paths are situated on any suitable surface(s) of the inlet to cause energy discharge through the conductive path(s) to occur in a direction from the inlet edge to the tip of the inlet body. In some embodiments, one or more conductive paths are situated on any suitable surface(s) of the engine to cause energy discharge through the conductive path(s) to occur in a forward direction from the tip of the inlet body. In some embodiments, one or more conductive paths are situated on any suitable surface(s) of the inlet to cause energy discharge through the conductive path(s) to occur in a direction that is at least partially transverse to the direction of air flow through the inlet. In some embodiments, one or more conductive paths are situated on any suitable surface(s) of the inlet to cause energy discharge through the conductive path(s) to occur along a curvilinear manner across the surface(s). In some embodiments, the conductive path(s) form any suitable shape on one or more surfaces of the inlet, to maximize, promote, and/or enhance the desired strength and direction of air expansion and/or thermal mitigation and/or the desired degree of shockwave mitigation. In some embodiments, as is illustrated in FIG. 7(a), two or more conductive paths are oriented as successive rings around the surface of the inlet body, such that phased energy discharge can be performed. In some embodiments, as is illustrated in FIG. 7(b), one or more conductive paths are oriented in a spiral or helical geometry around the surface of the inlet body. In particular, FIGS. 7(a)-(b) illustrate a supersonic engine that comprises a starter system having conductive paths that are situated on the inlet body (702) of the engine (704). In particular, FIG. 7(a) illustrates one embodiment in which concentric conductive rings (706a, 706b, 706c, 706d, and 706e) are situated on inlet body (702). FIG. 7(b) illustrates another embodiment, in which a conductive path (706) is situated on the inlet body (702) in a spiral or helical geometry. In some embodiments, the conductive path(s) are situated on one or more surfaces in a manner such that energy discharge from the conductive path(s) occurs across a major portion of (e.g., the entirety of) the surface of the inlet body, the inlet throat, and/or the inlet edge. In some embodiments, at least one conductive path forms a contour that circumnavigates at least one surface of the inlet.

Creation of Conductive Path(s) Using Laser(s)

In addition to depositing energy along surfaces, it is possible in some embodiments to ionize paths within air using electromagnetic radiation to form the conductive path. The conductive path can be created in any suitable manner. For example, the conductive path can be formed using electromagnetic radiation, such as from UV laser pulses, visible laser pulses, IR laser pulses, and/or combinations thereof. In one example, the electromagnetic radiation is provided through the use of a filamenting laser. Alternatively, the conductive path can be formed using an electric discharge. In some embodiments, the path of the filamenting laser is controlled such that a conductive path is generated in the path of the laser pulse. In this regard, the beginning and end of the conductive path can also be controlled by adjusting how the pulse is focused, or the like.

As with the energy deposited along an inlet surface, energy deposited along a line in air can be used to violently push the air cylindrically outward, thereby opening up a low density tube or core of air, through which a vehicle can propagate with little or no drag. This is illustrated by the Mach 2 runs illustrated in FIGS. 11(a)-(b). In particular, FIG. 11(a) illustrates a low-density core streaming over a cone being subjected to an air flow of Mach 2. As is illustrated in FIG. 11(b), significant drag reduction occurs as the low density core streams over the cone at Mach 2. These benefits increase dramatically with increasing Mach numbers. In addition to reducing drag, the ability to control the density distribution ahead of the vehicle allows one to control the amount of air and its distribution entering an inlet. This allows one to more or less steer air into an inlet, allowing enhanced ingestion and potentially lower drag. Furthermore, FIG. 11(a) illustrates how the air moved from in front of the vehicle wraps around the base, providing a much greater density/pressure from which the propulsion unit can push.

Figure 12A:
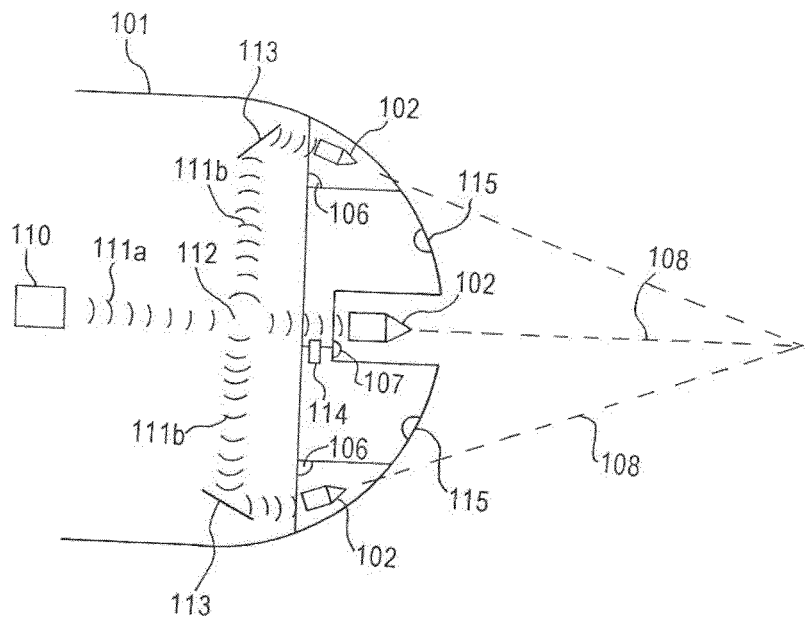
FIGS. 12(a)-(b): (a) is a schematic and (b) is a picture that illustrate example arrangements of energy emitters.
Figure 12B:
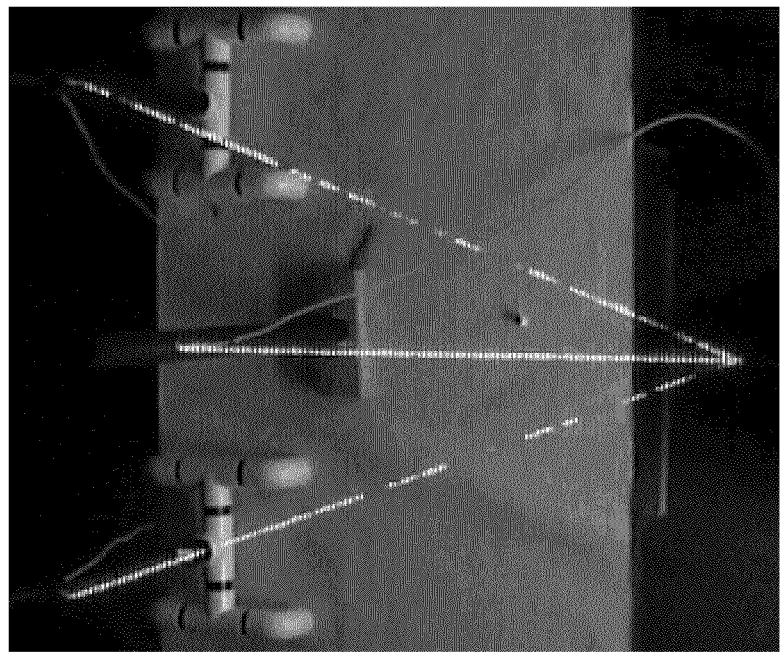

An example arrangement of energy emitters for ionizing conductive paths is illustrated in FIGS. 12(a)-(b). In particular, FIG. 12(a) illustrates a body 101 that includes several directed energy ports 106, 107. The energy ports 106, 107 are electrically isolated from each other, with two of the energy ports 106 having one polarity and the other energy port 107 having an opposite polarity. The electric discharge from the energy ports 106, 107 can be driven by one or more charge-storage and/or voltage-supply elements 114. The electromagnetic energy is emitted from a source 110, which can consist of a single emitter, as illustrated, or several emitters. The electromagnetic pulses 111 can be generated in rapid enough succession to be considered effectively instantaneous by the fluid dynamics being controlled. Additionally, if only one emitter is used, a single pulse 111a may also be split at a splitter 112 and sent to the different electromagnetic emission ports 102. The split pulses 111 b can be redirected using reflecting elements 113 and sent through focusing elements at the emission ports 102 to create the desired conducting circuit of ionized paths 108 to initiate and guide the electric discharge from the energy ports 106, 107. The entire process can be continually monitored by environmental sensors 115 to ensure effective implementation of the process through continual adjustments to the electric and electromagnetic discharges to accommodate changing factors and needs. The electrical isolation of the energy ports 106, 107 is aided because only optical coupling is required in the internal systems.

Figure 12C:
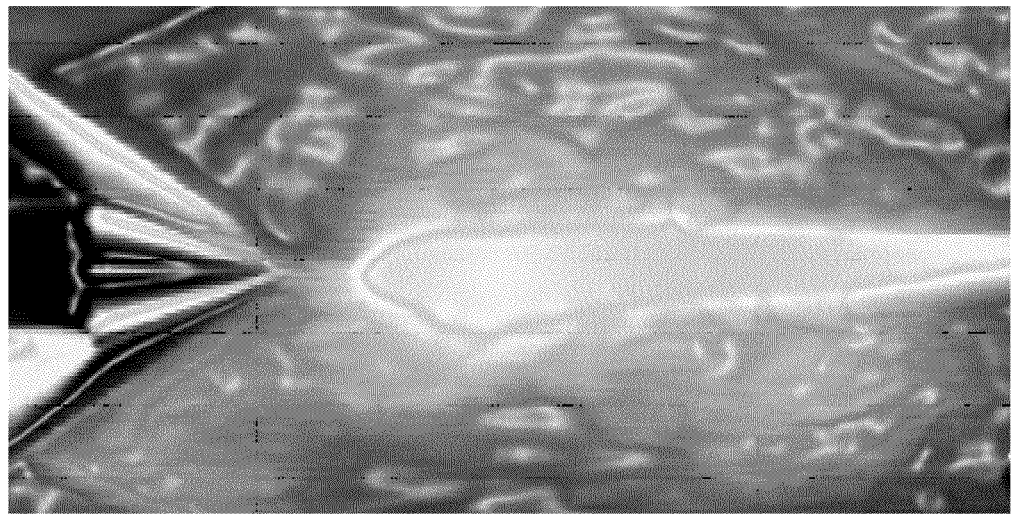
FIG. 12(c) is a picture that illustrates energy discharge along a partially ionized air path.

FIGS. 12(a)-(b), in this regard, illustrate geometries that are suitable for closing a circuit and depositing energy along the intersecting laser paths via laser discharge. FIGS. 12(a) and (b) illustrate an arrangement of electrodes, wherein the outside electrodes are oppositely polarized from the central electrode. The electrodes are used to ionize a permanently drawn pattern or physical string/line. FIG. 12(a) illustrates a more detailed schematic of a pulse split using focusing/discharge devices. FIG. 12(b) illustrates electric discharges in this same geometry using physical lines, wherein greater energy strength along the single central return path is illustrated as occurring, relative to the energy strength along the two outside paths. FIG. 12(c) illustrates the deposition of electrical energy along a partially ionized and heated path of air, as performed in a wind tunnel.

Energy Source

Any suitable energy source(s) can be used in the context of the present invention to discharge energy along the conductive path(s). In some embodiments, the energy source(s) is capable of depositing effectively continuous energy, for example in control of air flow in a wind tunnel, and/or capable of discharging a transient or discontinuous energy, for example, at the inlet of a supersonic or hypersonic jet engine. The energy source(s) can discharge any suitable type of energy, such as, for example, electric (direct or alternating current) energy, RF and/or microwave energy, and/or energy arising from explosive and/or combusting fuel discharge. In some embodiments, the energy source(s) are capable of delivering pulsed energy discharges.

Figure 15A:
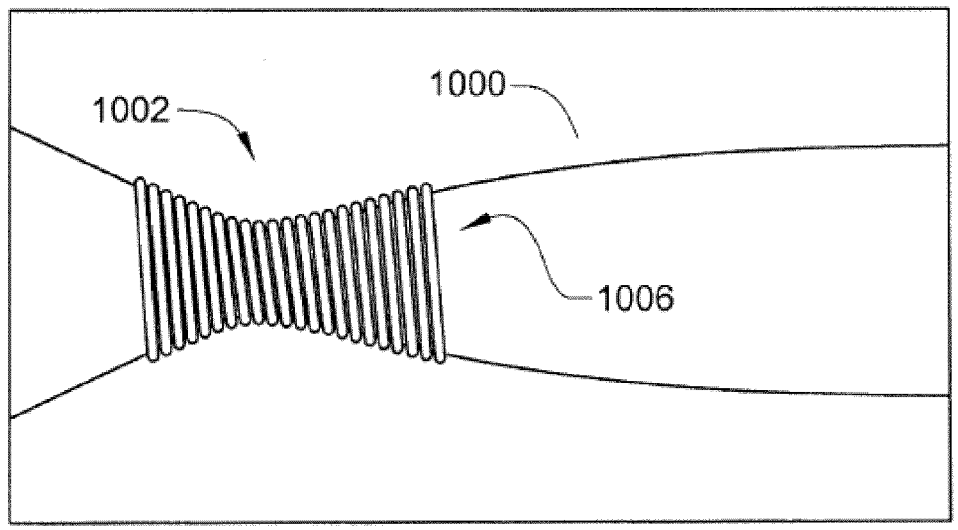
FIGS. 15(a)-(b) are schematics that depict embodiments of hypersonic/supersonic wind tunnels containing systems for energy deposition.
Figure 15B:
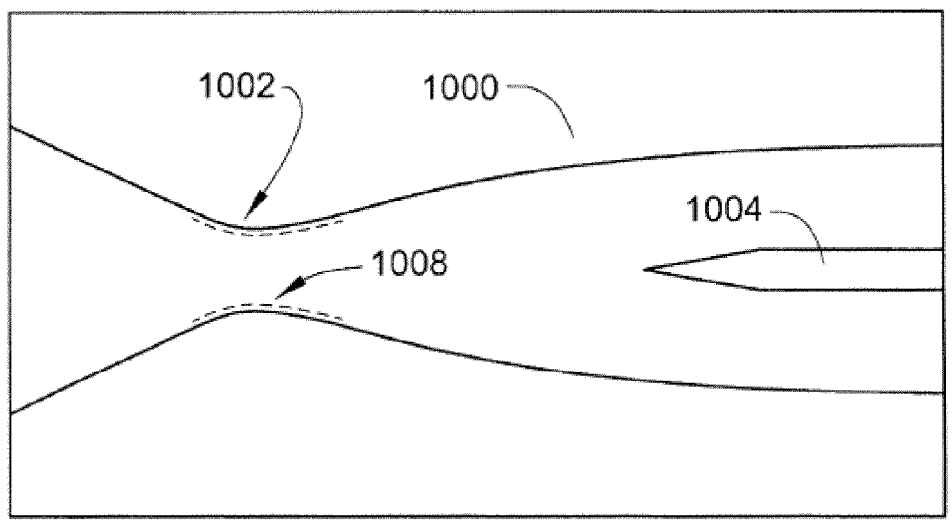

The energy source(s) can be configured to deposit energy along the conductive path(s) in any suitable manner. In some embodiments, for example, the energy source(s) discharge RF energy along the conductive path(s) to heat/ionize a targeted region of gas/air or the air along and proximate to existing conductive or ionized path(s). Electric arc/discharge heating at a nozzle surface can also be the energy source. In some embodiments, the surface(s) of interest can comprise a dielectric nozzle or throat, such as separate units that use increasingly higher temperature materials. In some embodiments, such as in wind tunnels, RF heating is achieved proximate to a dielectric nozzle that allows the RF energy to penetrate through the wall of the dielectric nozzle and heat the air along (or near) an inside surface of the nozzle, as is illustrated in FIGS. 15(a)-(b). This approach can be used to create an ionized or heated sheath along the entire inside surface of the nozzle region of the wind tunnel. To facilitate the electric discharge/arc, in some embodiments, one or more conductive paths (e.g., slightly conductive paths or areas) can be embedded in the surface of the dielectric material, thereby allowing local energy deposition along the conductive path or region that is commensurate with the driving voltage or current. Any suitable material can be used, in this regard, for situating the conductive path(s) on the dielectric material.

The energy source can be situated in any suitable location(s).

Amount of Energy

Figure 6:
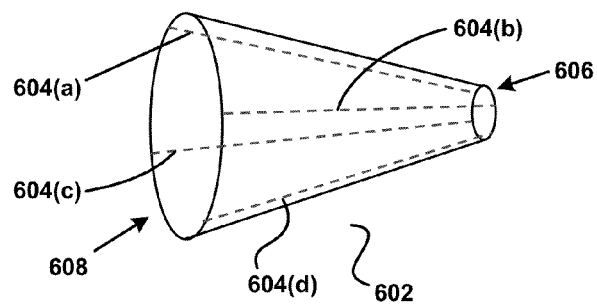
FIG. 6 is a schematic that depicts a funnel-shaped inlet arranged with conductive paths.

Any suitable amount of energy can be used in the context of the present invention. In some embodiments, for example, the amount of energy to push open a certain radius from a source of deposited energy conducted down a conductive path can be calculated as a fraction of the energy needed to open up the same radius in free space (these calculations have been shown by Plooster to hold equally well for dotted, dashed, or continuous lines of energy-deposition). To open up a given radius from a flat surface, typically may require no more than one-half of the energy needed to open up the same radius in unconstrained air. As an example, to open a 50 cm (20") long, 5 cm (2") diameter channel along a flat surface at one atmosphere of pressure, may require about 160 J. For example, in free space, at atmospheric pressure, calculating this amount of energy to open a 5 cm diameter channel with length of 50 cm, using the relationship Energy/channel length=$5.34*pressure*(radius)^2$ yields an energy requirement of roughly 337 J to open such a cylindrical channel of 50 cm length. When the energy is deposited along a straight line on a surface, the channel that is generated may be roughly a half cylinder, requiring half of the energy to open up, such as, for example, about 100-300 J, about 150-250 J (e.g., about 168.5 J). If the surface is concave, in some embodiments, such as is illustrated in FIG. 6, the channel may span less than the 180-degree arc of a half cylinder. To attain the same rough radial extent (for example, 2.5 cm) from the line source of energy in this constrained geometry may therefore require commensurately less energy, since the actual channel volume is yet smaller than the half-cylinder. Displacing larger volumes of air (creating larger channels) may require proportionally greater amounts of energy, and displacing smaller volumes of air will require proportionally less energy. Calculating rough energy values in this fashion may be appropriate when the energy is deposited over a short period of time with respect to the gas expansion to create the channel. The actual geometries that will be observed may be modified by any air flow taking place during operation. In certain applications, the energy may be deposited over durations ranging from pulsed to continuous, depending on the desired effect. The duration of the energy deposition depends primarily on the energy deposition technique with: RF and microwave deposition being effectively continuous and of arbitrary duration; electric discharges ranging from approximately 0.001 ms to continuous; different laser-deposition techniques ranging from femto second duration to continuous; and the chemical energy deposition duration ranging from short explosive deposition that depends on the volume, physical dimension, and environmental conditions, to continuous deposition when continually burning fuel injected from an inlet surface. The specific energy-deposition duration may be determined by the application and desired results, with shorter durations more effectively pushing gas away from the energy-deposition region and continuous application causing much less pronounced spatial and temporal discontinuities and disturbances, while still heating and expanding the air/gas to yield lower densities in the desired volumes.

The amount of energy discharged by the system (with each energy discharge) is largely dictated by the particular design criteria. For very small inlet applications, for example, the energy amount could be diminished from the above <168.5 J by a factor of 5000, if the effective radius is 10 times smaller (2.5 mm) on a concave surface, with an effective length 50 times shorter (1 cm). This would result in energy discharge requirements of <38 mJ at sea level pressures, with a linear reduction in energy requirement with decreasing atmospheric pressure. For extremely large applications, such as a large inlet of a space-plane, the surface of which can span many square meters, the amount of energy required to create a volume stand-off from this surface by roughly 10 cm can be in the range of roughly 350 kJ at atmospheric pressure, also reduced linearly as a function of pressure, requiring roughly 35 kJ to displace 2 cubic meters of air/gas for implementation at 0.1 atmospheres of pressure. As a result of this large range of sizes in application, as well as operating conditions, a broad range of amounts of energy per pulse may be used. In particular, for example, extremely small applications at lower pressures may utilize from 1 mJ to 1 J, such as, for example, from 1 mJ to 750 mJ, from 5 mJ to 500 mJ, from 10 mJ to 400 mJ, from 50 mJ to 200 mJ, from 20 mJ to 150 mJ, or from 1 mJ to 100 mJ. Intermediate applications, including larger volumes of displaced air at various pressures, may utilize from 0.5 J to 1 kJ, such as, for example, from 1 J to 750 J, from 5 J to 500 J, from 10 J to 400 J, from 50 J to 1 kJ, or from 10 J to 200 J of energy being deposited per pulse. Large applications, including larger displaced volumes at various pressures, may utilize from 750 J to 1 MJ, such as, for example, 1 kJ to 800 kJ, from 5 kJ to 500 kJ, from 10 kJ to 400 kJ, from 50 kJ to 1 kJ, or from 10 kJ to 200 kJ of energy being deposited per pulse.

Energy can be provided, depending on the design criteria, in many different forms, including but not limited to chemical (such as, propellant, explosive, and/or fuel), electrical (such as, electric discharge and/or ohmic heating), and electromagnetic (such as, RF, microwave, and/or laser/optical). Depositing chemical energy to heat/expand the air is typically a function of the reaction to release the chemical energy, and can depend on such reaction mechanisms as temperature, pressure, catalysts, reagents, and physical geometry of the reactants and combustion environment. Certain propellants and even fast reactions of fuel may lead to explosive/impulsive energy-deposition over timescales of 100 nanoseconds to several milliseconds. Of course, steady and/or continuous deposition of chemical energy may also be achieved by continuous reaction or combustion of the reactants. For depositing electromagnetic energy into the gas or air, large ranges of frequencies and voltages can be used, depending, for example, on the air/gas properties and coupling efficiency. In some embodiments, laser energy at a high frequency (such as from the ultraviolet to infrared portion of the spectrum) may be used. Temporal duration of laser energy deposition may be dictated by the laser pulse duration, which may be dictated in large part by the laser oscillator details. Different groups of general pulse widths may include, but are not limited to, sub-picosecond (pulse duration between 1 fs and 1 ps); sub nanosecond (pulse duration between 1 ps and 1 ns); nanosecond (between 1 and 20 ns); submicrosecond (pulse duration between 20 ns and 1 microsecond); and long pulse (pulse duration longer than 1 microsecond). Millimeter wave radiation may also couple to the air when properly focused, with varying efficiencies throughout the entire microwave spectrum, extending down to lower radio frequencies, and even into the very low frequencies into the tens of Hz. In these cases, the duration of the deposition may be as short as a full cycle of the oscillation, with practical initiation and coupling to the air/gas, such as calling for a minimum of 3-5 cycles. In some embodiments, more cycles may be employed to the limit that the deposition becomes steady-state, either being "on" or "off", with the only transient nature to the deposition occurring when the energy deposition is engaged and/or disengaged (although some modulation of effects may be observed, depending on the specific nature of the oscillatory modulation and coupling dynamics to the flow). In between these transient portions of a steady-state application, the energy deposition may simply heat the air/gas (with any associated ionization that can help the coupling process) in an effectively continuous fashion. In the limit that a constant (non-oscillating) voltage is turned on to initiate electric current, the energy deposition may simply direct current electronic/ohmic energy deposition. For this type of direct current discharge, short deposition times may result in impulsive heating that can expand regions of air/gas to achieve the results described in this application. The shortest direct electrical current deposition times achievable are dictated primarily by discharge geometry, voltage, and the nature of any conductive path used to guide the discharge. Deposition over short spatial lengths, along a relatively good conductivity path (which can more easily guide the formation of an ionized path to heat the air), using a high electric field and small amount of charge, may result in sub-microsecond electric discharges. Other conditions can yield discharges lasting several microseconds, and depending on the amount of charge to propagate the ionized path that is formed, the energy discharge can take tens of microseconds, hundreds of microseconds, milliseconds, and can in fact be operated continuously as a direct current arc heating the air. The actual amount of energy deposited into the flow depends on voltage, current, and the specific temporal form of the voltage pulse that is used to create the electric discharge. The electric field required to break down air can be tens of kV/cm, depending on the air density.

Depending on the geometry of the electrodes and any conductors in the conductive path, the electric field can locally become strongly amplified, reducing the voltage requirement to jump a given length of the conductive path in air or along a surface. As a result, depending on the length of the path and/or area for a surface discharge, as well as the path geometry and composition, total voltages to achieve breakdown can range from 100 V to 100,000 V, such as from 200 V to 80,000 V, from 400 V to 40,000 V, from 100 V to 20,000 V, or from 500 V to 8,000 V. For more intermediate applications, the voltage requirements can be from 1 to 1000 kV, such as, for example, from 5 to 800 kV, from 10 to 600 kV, from 20 to 700 kV, from 40 to 500 kV, or from 60 to 400 kV. In some embodiments, such as with large applications, the voltage requirements will exceed a MV. For a given geometry, to which a range of voltages can be applied, the higher the voltage applied, the lower current may be required in the discharge to obtain the same amount of dissipated energy. Again, tuning of the pulse shape may be needed to optimize the amount of dissipated energy that actually couples into heating the gas/air.

For pulsed energy deposition, the pulses can be delivered individually or with a repetition rate that can vary, typically with inter-pulse durations that can be roughly as short as the duration of the energy pulse itself, or repeated in an attempt to achieve a certain goal, which can be determined with less frequency. These values may depend on the application size and the flow speed. For small fast systems, repetition rates may be usefully applied from 1 Hz to 10 kHz, such as, for example, from 100 Hz to 5 kHz, from 200 Hz to 3 kHz, or from 500 Hz to 1 kHz. For more intermediate applications, repetition rates may be usefully applied from 5 kHz to 100 kHz, such as from 10 kHz to 80 kHz, from 20 kHz to 70 kHz, or from 40 kHz to 90 kHz. For larger-scale applications, repetition rates may be usefully applied from 75 kHz to 1 MHz, such as, for example, from 100 kHz to 800 kHz, from 200 kHz to 700 kHz, or from 400 kHz to 900 kHz.

In some embodiments, in response to an un-start assessment by at least one sensor, the controller initiates energy discharges of successively increasing strength along at least one conductive path until the engine is successfully started, such as an initial energy discharge of 50-100 J, and subsequently increasing the energy discharge amount by 20-50 J, until the engine is successfully started. Any suitable internal between successive discharges can occur in this regard, such as an inter-discharge duration of 0.01-100 milliseconds.

Sensor Component

The system can comprise any suitable sensor(s) for identifying, assessing, identifying, detecting, and/or determining the existence of a shockwave or flow condition that requires modification via energy deposition. In particular, for example, the sensor(s) can be any suitable air pressure sensor(s), accelerometer(s), optical sensor(s), and/or any fast activating pressure transducer(s) or other detection technologies. Optical sensors, such as photodiodes, can also be used to indicate the potential of an incoming blast wave to be mitigated. The sensor(s) can be positioned in any suitable location. In some embodiments, for example, one or more sensors can be situated on (or proximate to) a surface of the inlet throat, the inlet edge, and/or the inlet body. In some embodiments, one or more sensors are situated on surface(s) of the inlet throat. In some embodiments, one or more sensors are situated in the test section to monitor flow conditions. In some embodiments, one or more sensors are situated at specific positions on an asset to detect optical flashes to indicate the potential of incoming blast waves.

Controller

The controller can be any suitable processor that is capable of receiving input information from the sensor(s), determining whether the input information meets some threshold value(s), and outputting command signals to energy source(s) that cause the energy source(s) to discharge energy in a strength, duration, and pattern defined by the controller. Such operation of the controller can be preprogrammed and/or automatic, with the potential of additional partial management or override (such as in real-time) by a human operator, depending on the application.

The degree of lessening, modification, and/or elimination of shockwave can be controlled by controlling the strength and duration of energy deposited along one or more path(s), and/or by controlling the timing and/or strength of energy discharge across two or more different paths of the system.

In some embodiments, the system comprises two or more conductive paths, and the controller controls the timing of electric discharges along the conductive paths in a phased manner. In some embodiments, the system comprises two or more conductive paths that are oriented as successive rings around the surface of the inlet surface, and the controller controls the timing of electric discharges (such as circular electric arcs) along the conductive paths in a phased manner starting with the forward-most conductive ring and progressing in an aft direction, or vice versa. In some embodiments, the system comprises a first conductive path and a second conductive path, and the controller controls the timing of electric discharges along the first and second conductive paths in a phased manner, such that energy discharge along the first conductive path occurs before energy discharge along the second conductive path occurs, e.g., wherein the energy discharge along the first conductive path occurs immediately before energy discharge along the second conductive path occurs. In some embodiments, the system comprises a series of two or more conductive paths that are arranged in series from one portion on an inlet surface to a second portion on the inlet body, and the controller controls the timing of electric discharges along the conductive paths in a phased manner starting with the first conductive path and progressing toward the second.

In some embodiments, in response to the assessment by at least one sensor of an un-start condition, or potential blast wave, or unacceptable test section or throat temperature in a wind tunnel, the controller causes at least one energy source to discharge energy along at least one conductive path.

In some embodiments, in response to an assessment by at least one sensor, the controller initiates energy discharges of increasing strength along at least one conductive path until the situation has been successfully addressed. Furthermore, any suitable duration between successive discharges can occur in this regard.

Energy Transducer

In some embodiments involving supersonic or hypersonic flight, the energy deposition system further comprises at least one technique for capturing and converting energy exerted on the air vehicle during flight into energy for powering the energy deposition system. For example, such an energy transducer can convert thermal energy set up in temperature gradients within the vehicle into energy for powering the energy deposition system. As a second example, such an energy transducer can convert frictional forces, exerted upon one or more portions of the air vehicle and/or energy transducer, into energy for powering the energy deposition system. One such embodiment takes advantage of the principle that results in very high voltage charging of air vehicles during supersonic or hypersonic flight, in which charge generated at the front of the air vehicle is separated from the vehicle and transported to its back to set up a standing voltage, in particular for non-metallic (i.e. non-electrically conductive) air frames.

Charging of non-conducting surfaces can occur in high-altitude, high-speed flight. The non-conducting elements, in this regard, can be coated with a somewhat electrically conductive coating and/or comprise grounding strips to help carry charge to the metal airframe. Metal will also become charged with respect to the air, resulting in corona discharge at fine points of the metal airframe. To prevent this from occurring on critical communications equipment, static discharge wicks (which look like pointy antennae) can be attached to trailing edges. These pointy, conductive wicks initiate the corona discharge and the return of the electrons to the poorly-conductive air.

In some embodiments, a charge difference can be stored between the entire airframe and the leading edge of interest. This approach stands to use the conductive/connected portion of the entire air-frame as a charge reservoir, electrically separated from the vehicle nose, or some leading edge, including the inlet leading edge. This will result in an electrical-potential difference between the leading edge of interest and the rest of the airframe. This potential difference can simply maintain until a discharge is initiated/guided (e.g., using a filamenting laser) to dissipate the charge. In the case of a fixed, partially-conductive path, the discharge can occur as the system charges up to the breakdown threshold. A continual or high-rep-rate corona/discharge could be made possible in this fashion, which could also aid in the combustion process, by pre-ionizing the air. If uncontrolled discharges are undesirable, one could arrange for discharge wicks to be engaged when a discharge is unwanted, and then have them electrically disconnected from the vehicle to allow the charge to build up to the discharge threshold when the vehicle charge is needed to generate a discharge . . . e.g. for when an inlet needs to be started.

EXAMPLES

The following examples are given as particular embodiments of the invention and to demonstrate the advantages thereof It is understood that the examples are given by way of illustration and are not intended to limit the specification or the claims that follow in any manner.

Figure 3A:
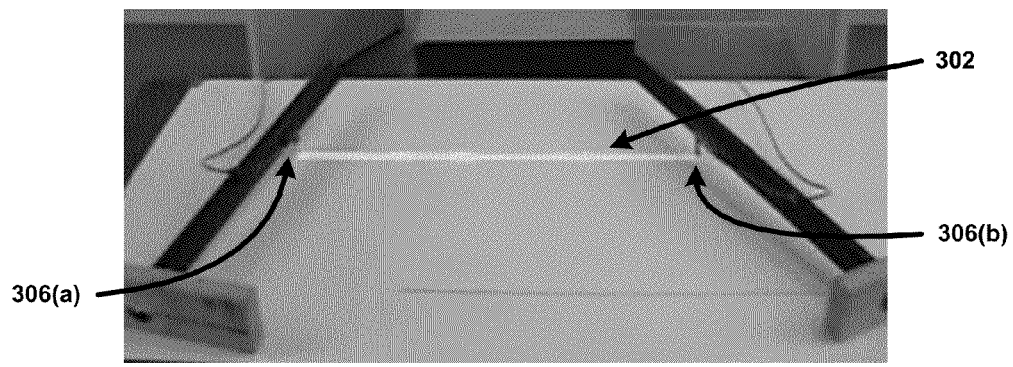
FIGS. 3(a)-(c) are pictures illustrating the formation of electric discharges of different shapes.
Figure 3B:
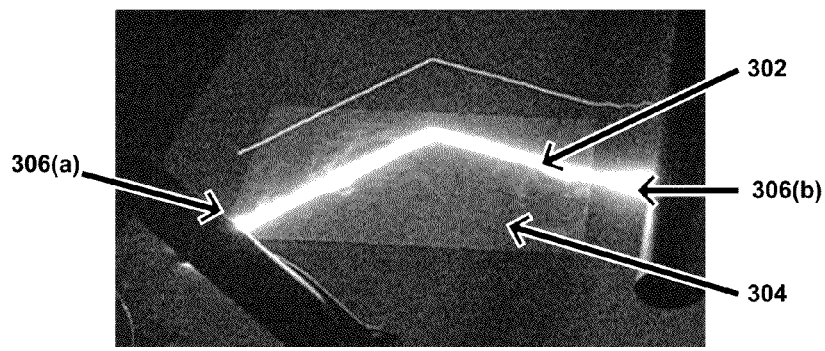
Figure 3C:
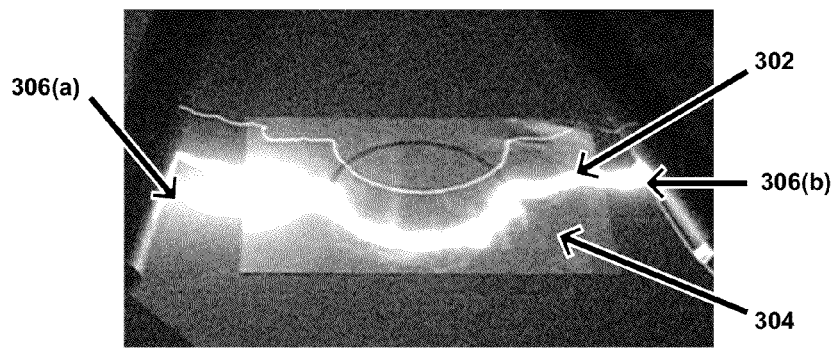

As is illustrated in FIGS. 3($a$)-($c$), experiments were performed wherein conductive graphite paths (302) were formed on paper surfaces (304) in various geometric patterns, such as a straight-line conductive path (see FIG. 3($a$)), a sharp angle conductive path (see FIG. 3($b$)), and a semi-circular conductive path (see FIG. 3($c$)). The conductive paths were formed such that they did not change the mechanical smoothness or flow properties across or along the surface. All such conductive paths were then connected to electrodes (306$a$ and 306$b$) on each end, and sufficient voltage and charge was applied to the conductive paths from the electrodes to cause energy deposition along the conductive paths by electric arc, which generated strong electric discharges from the conductive paths (visible in the figures as a white discharge along the entirety of the conductive paths). The shape of the discharges, in this regard, were in the shape of the conductive path. In this manner, it was discovered that conductive paths can be used to guide electric discharges along specific paths. In each of these cases, the electric discharge was found to be incapable of jumping along unmodified surfaces, but was capable of strongly discharging across the enhanced conductivity paths (and adjacent air) that were formed in a variety of desired shapes or orientations, such as straight lines, sharp angles, semi-circles, and helices, among other shapes. It was also found that the flow is only altered by the energy deposited along the conductive paths, and that energy can be deposited repeatedly along the conductive paths before degrading the electrical performance of the path. Similar experiments were performed that involved forming or writing conductive paths (that did not degrade) on various other types of nonconductive and dielectric surfaces in a number of manners, which can be modified to accommodate the nozzle walls.

Figure 4:
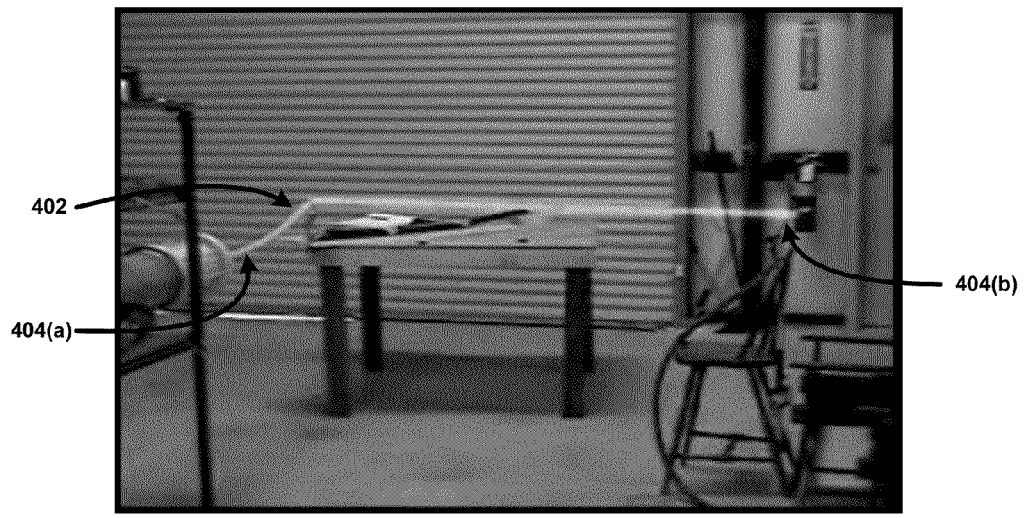
FIG. 4 is a picture illustrating the formation of an electric discharge along a partially conductive fiber.

As is illustrated in FIG. 4, experiments were performed in which electric discharges were formed in free space. Specifically, a weakly conductive coating compound comprising a thick matrix material and embedded conductive particles was formed. A nonconductive line or string was then coated with the compound, to form a line with a weakly conductive coating (402). The line was then connected to electrodes at each end (404$a$ and 404$b$). Electric current was discharged along the weakly conductive line and electric discharges (visible in the figure as a white discharge along the entirety of the coated line 402) were found to be guided along the weakly conductive coating and the neighboring air. In this manner, the guided electric discharges mimicked the guiding properties of laser-induced plasma.

Figure 5:
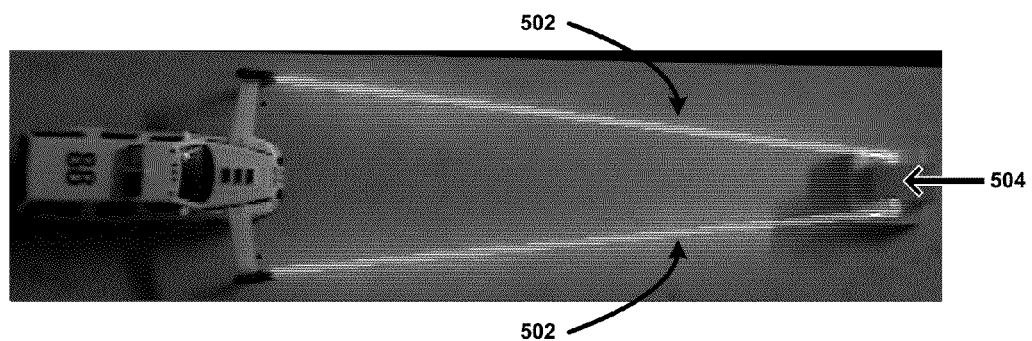
FIG. 5 is a picture illustrating the formation of an electric discharge along two partially conductive fibers.

As is illustrated in FIG. 5, an electric discharge was formed along two partially conductive fibers (502) and a conductive medium (504) connecting the two fibers.

FIG. 6 illustrates a funnel-shaped inlet (602) having four conductive paths (604a, 604b, 604c, and 604d) that extend from near, or at, the throat of the inlet (606) to near, or at, the leading edge of the inlet (608). In this case, a potential difference would be established between electrodes near/at the throat and near/at the leading edge, which would allow current to pass along the paths established as more conductive than the rest of the inner inlet surface. The actual paths should not be so conductive that they do not deposit energy in the air. They should only facilitate the propagation of the electric discharge, using ionized air as a fundamental element of the conduction process. This will allow the discharge to heat the air, dissipating the bulk of the discharge energy in the ionized air.

FIGS. 8(a)-(b) illustrate funnel-shaped inlets (802) having conductive path(s) (804) (depicted in hashed lines in the figures) that are arranged in two different geometries on the inlet wall, and which extend from the throat region (806) of the inlet to the leading edge (808) of the inlet. FIGS. 8(a)(1) and 8(b)(1) illustrate the undesired standing shockwave (812) in front of the inlet. FIGS. 8(a)(2) and 8(b)(2) illustrate the expansion of air (810) proximate to the conductive paths (804). FIGS. 8(a)(3) and 8(b)(3) enhanced compression of the backed-up air in the inlet by the expanding air (810), which is intended to help the air fit through the throat and swallow the undesired shockwave (812).

As is illustrated in FIGS. 9(a)-(b), energy can be deposited across a broad surface (904) of the inlet (902). Specifically, FIG. 9(b) illustrates a shaded surface region of the inlet body of FIG. 9(a) across which energy is deposited to effect inlet starting.

FIG. 10 illustrates the manner in which the Kantrowitz limit for starting inlets varies with cowl approach mach number. In particular, as is illustrated, once an inlet is started it can tolerate higher internal contraction (CRint) with the higher running contraction improving engine performance. In this regard, inlets designed for speeds of about Mach 7-10 typically must have significant CRint, whereas inlets with CRint on the order of 2.5-3 exceed the Kantrowitz limit for self-starting. As is illustrated in FIG. 10, the Kantrowitz limit reduces fixed geometry inlet contraction and performance.

The inlet starting system can result in lift of an axisymmetric body, even at zero angle of attack, and also allows for inlet restarting at lower, off-design Mach numbers. The system also eliminates the need for passive flow spillage or mechanical actuation, resulting in smoother/more efficient transitions to scramjet operation. The system will result in mitigating drag and heating on the scramjet body and result in more efficient operation. The system is scalable over any desired flow rates (such as any desired large-scale flows), considering that a 100-fold increase in flow-rate requires less than a 5-fold increase in the axial dimension of the system. Additionally, beyond mitigating drag/heating, and enhancing the ability to i) start at lower Mach numbers ii) have smoother transitions and iii) provide lift at zero angle of attack with no additional control surfaces, the system enhances the combustibility of the reactants, by not only heating the incoming air, but also by dissociating a small fraction of it to seed combustion process in the engine through the introduction of activated/metastable states. This likely improves coldstart capability and combustion efficiency.

Figure 13A:
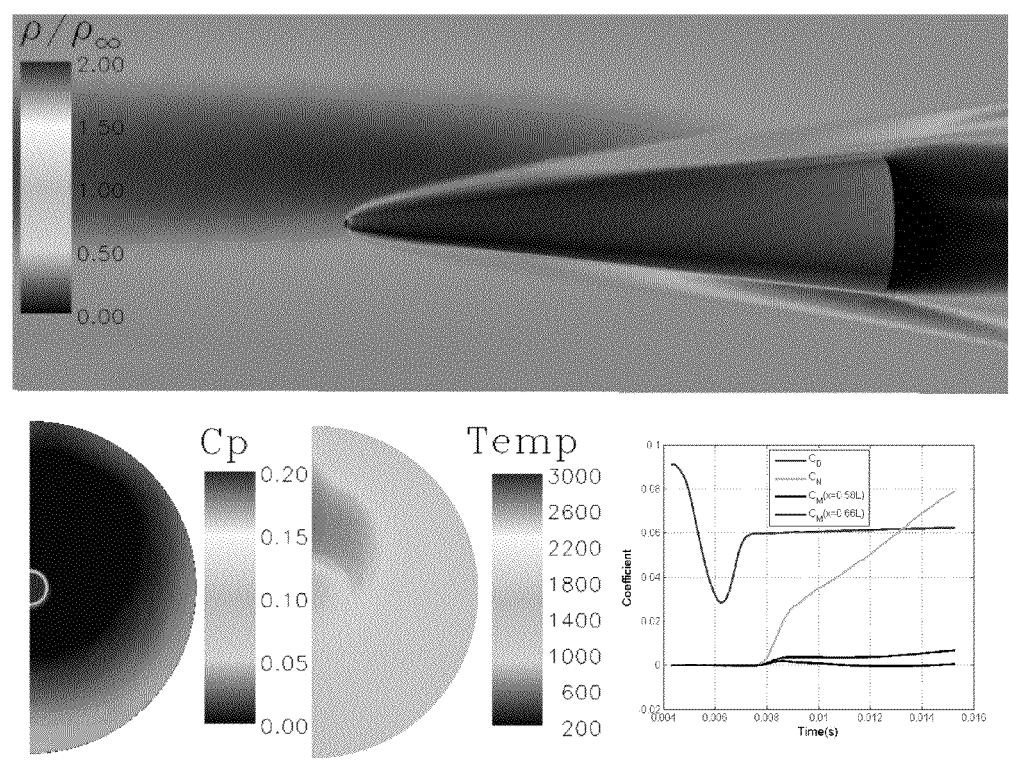
FIGS. 13(a)-(c) are compilations of pictures and graphs that illustrate measurements on an axisymmetric body being subjected to various hypersonic air flows created through energy deposition.
Figure 13B:
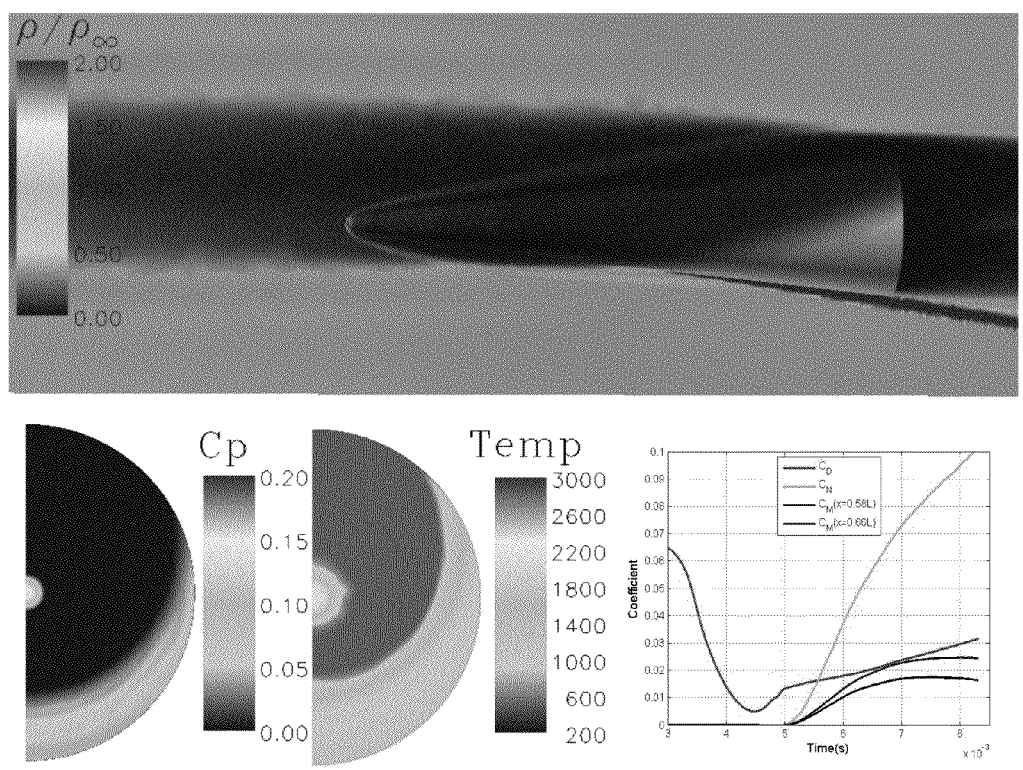
Figure 13C:
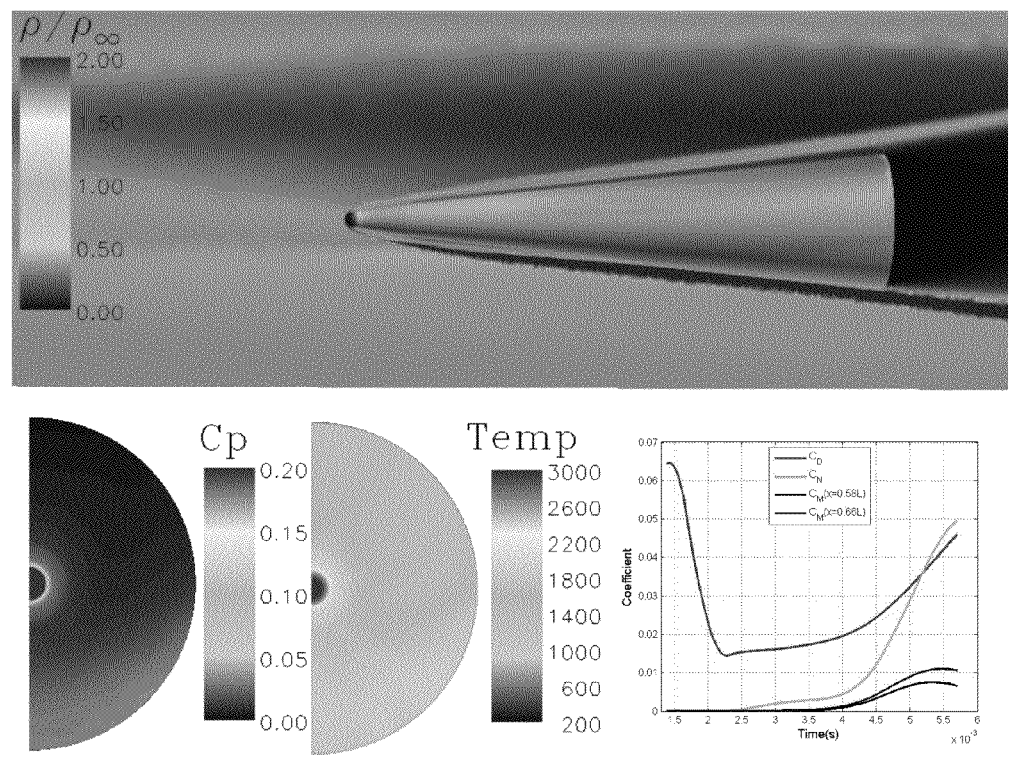

FIG. 13(a)-(c) illustrates the forces and moments exerted on an axisymmetric body being subjected to Mach 6, 10, and 20 air flows, respectively, with zero angle of attack. In addition to depicting the pressure, density, and temperature distributions, FIGS. 13(a)-(c) shows the control forces as the low-density core is moved off-axis from being coaxial with the core. These control forces can be used not only to stabilize and steer the vehicle, but also to generate lift at a zero angle of attack. The calculated accelerations range from 2 to 130 G's, depending on the vehicle size (operational sizes), Mach number (Mach 6-20), and altitude (15-45 km). In particular, energy was deposited along a line parallel to the axisymmetric body axis and was shifted upward off-center. When the energy-deposition line was collinear with the body axis, drag was minimized (eliminating more than 90% of the drag), and the control forces/moments were zero. As the low-density core was translated upward, the drag slowly increased, and the control forces increased dramatically. As an example, at Mach 10 at 30 km, with a zero angle of attack for an approximately 8° sphere-cone, approximately 70-80% of the drag was eliminated, while sufficient lift was generated to balance gravity (1 G). The maximum lift that was observed was about 12 G (with the drag still being reduced by about 50%).

All publications and patent applications mentioned in this specification are herein incorporated by reference to the same extent as if each individual publication or patent application was specifically and individually indicated to be incorporated by reference.

It will be apparent to one of ordinary skill in the art that many changes and modification can be made to the disclosures presented herein without departing from the spirit or scope of the appended claims.

What is claimed is:

1. An energy deposition system to direct a blast wave in order to protect and mitigate damage to an asset, wherein the system comprises:
    at least one conductive path to channel expanding gas in a direction other than into the asset;
    at least one energy source that is operably connected to the at least one conductive path;
    at least one sensor for assessing the likelihood of a blast wave to be mitigated; and
    at least one controller that is operably connected to the at least one energy source and the at least one sensor, for controlling energy discharge from the at least one energy source along the at least one conductive path in response to assessment of a potential blast wave by the at least one sensor.

2. An energy deposition system for use in an air vehicle containing one or more inlets, comprising
    a system for starting the one or more inlets to ingest supersonic or hypersonic air flow, wherein the system for starting the one or more inlets comprises:
    at least one partially conductive path along a surface of the one or more inlets;
    at least one energy source that is operably connected to the at least one partially conductive path;
    at least one sensor for assessing whether the one or more inlets is in an un-start condition;
    at least one controller that is operably connected to the at least one energy source and the at least one sensor, for controlling energy discharge from the at least one energy source along the at least one partially conductive path in response to assessment of an un-start condition by the at least one sensor; and
    at least one energy transducer for capturing and converting energy exerted on the air vehicle during flight into energy for powering the system for starting the one or more inlets, wherein the at least one energy transducer converts frictional forces into energy for powering the system for starting the one or more inlets.

3. An energy deposition system for use in an air vehicle containing one or more inlets, comprising
a system for starting the one or more inlets to ingest supersonic or hypersonic air flow, wherein the system for starting the one or more inlets comprises:
at least one partially conductive path along a surface of the one or more inlets;
at least one energy source for generating electric discharges that is operably connected to the at least one partially conductive path;
at least one sensor for assessing whether the one or more inlets is in an un-start condition; and
at least one controller that is operably connected to the at least one energy source and the at least one sensor, for controlling the electric discharges along the at least one partially conductive path in response to assessment of an un-start condition by the at least one sensor,
wherein the at least one partially conductive path comprises two or more partially conductive paths, and wherein the at least one controller controls the timing of the electric discharges along the two or more partially conductive paths in a phased manner.

4. An energy deposition system for use on an asset, comprising
a system for effecting flow control, wherein the system for effecting flow control comprises:
at least one path along at least one surface of the asset;
at least one energy source that is operably connected to the at least one path;
at least one sensor for assessing if flow control is needed; and
at least one controller that is operably connected to the at least one energy source, for controlling energy discharge from the at least one energy source along the at least one path;
wherein the at least one path comprises two or more conductive paths, wherein the at least one energy source generates electric discharges, and wherein the at least one controller controls the timing of the electric discharges along the two or more conductive paths.

5. The energy deposition system of claim 4, wherein the energy deposition system is used in an air vehicle's engine.

6. The energy deposition system of claim 4, wherein the energy deposition system generates low density channels, along which high pressure gas can flow preferentially.

7. The energy deposition system of claim 4, wherein the flow control reduces pressure.

8. The energy deposition system of claim 4, wherein the flow control directs high pressure products.

9. The energy deposition system of claim 4, wherein the energy deposition system is used in an engine.

10. The energy deposition system of claim 4, wherein the flow control mitigates confinement experienced by expanding gases.

11. The energy deposition system of claim 4, wherein the flow control reduces drag.

12. The energy deposition system of claim 4, wherein the flow control mitigates engine unstart conditions.

13. The energy deposition system of claim 4, wherein the flow control mitigates an engine unstart.

14. The energy deposition system of claim 4, wherein the flow control mitigates resonance.

15. The energy deposition system of claim 4, wherein the flow control mitigates engine noise.

16. The energy deposition system of claim 4, wherein the flow control mitigates screech.

17. The energy deposition system of claim 4, wherein the flow control increases efficiency in a turbine engine.

18. The energy deposition system of claim 4, wherein the flow control disrupts and dissipates shock waves in a turbine engine.

19. The energy deposition system of claim 4, wherein the flow control dissipates waves.

20. The energy deposition system of claim 4, wherein the flow control disrupts and dissipates waves in a turbine engine.

21. The energy deposition system of claim 4, wherein the at least one controller controls the timing of the electric discharges along the two or more conductive paths in a phased manner.

22. The energy deposition system of claim 21, wherein the flow control reduces drag along at least one surface of the asset.

23. An energy deposition system to mitigate unstart in an engine, wherein the system comprises:
at least one conductive path along at least one surface of the engine;
at least one energy source that is operably connected to the at least one conductive path;
at least one sensor for assessing at least one parameter contributing to unstart conditions; and
at least one controller that is operably connected to the at least one energy source and the at least one sensor, for controlling energy discharge from the at least one energy source along the at least one conductive path in response to the at least one sensor.

24. An energy deposition system to mitigate noise in an engine, wherein the system comprises:
at least one conductive path along at least one surface of the engine;
at least one energy source that is operably connected to the at least one conductive path;
at least one sensor for assessing at least one parameter contributing to noise; and
at least one controller that is operably connected to the at least one energy source and the at least one sensor, for controlling energy discharge from the at least one energy source along the at least one conductive path in response to the at least one sensor.

* * * * *